(12) United States Patent
Shih et al.

(10) Patent No.: US 11,798,309 B2
(45) Date of Patent: Oct. 24, 2023

(54) FINGERPRINT IDENTIFICATION METHOD FOR PANEL, ELECTRONIC DEVICE, AND CONTROL CIRCUIT

(71) Applicant: NOVATEK MICROELECTRONICS CORP., Hsinchu (TW)

(72) Inventors: Wei-Lun Shih, Hsinchu (TW); Yuan-Heng Lu, Hsinchu (TW); Ting-Hsuan Hung, Hsinchu (TW); Jia-Lin Chen, Kaohsiung (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 17/720,115

(22) Filed: Apr. 13, 2022

(65) Prior Publication Data

US 2022/0335743 A1 Oct. 20, 2022

Related U.S. Application Data

(60) Provisional application No. 63/175,061, filed on Apr. 15, 2021.

(51) Int. Cl.
*G06V 40/13* (2022.01)
*G06F 3/041* (2006.01)
*G06F 3/044* (2006.01)

(52) U.S. Cl.
CPC ........ *G06V 40/1306* (2022.01); *G06F 3/0412* (2013.01); *G06F 3/0446* (2019.05); *G06F 3/04164* (2019.05); *G06F 3/04166* (2019.05)

(58) Field of Classification Search
CPC .............. G06V 40/1306; G06F 3/0412; G06F 3/04164; G06F 3/04166; G06F 3/0446
See application file for complete search history.

(56) References Cited

U.S. PATENT DOCUMENTS

| | | | |
|---|---|---|---|
| 2017/0061190 A1* | 3/2017 | Chen | G06V 40/1306 |
| 2020/0042762 A1* | 2/2020 | Fu | H04N 5/35536 |
| 2020/0050818 A1* | 2/2020 | He | G06V 40/1394 |
| 2021/0191554 A1* | 6/2021 | Jun | G06F 3/0443 |

\* cited by examiner

*Primary Examiner* — Jonathan A Boyd
(74) *Attorney, Agent, or Firm* — MARSHALL, GERSTEIN & BORUN LLP

(57) ABSTRACT

Provided are a fingerprint identification method for a panel, an electronic device and a control circuit. The method includes setting voltages on the data lines and sensing lines that may affect a fingerprint identification result to a predetermined DC voltage during a predetermined time period before a start of a fingerprint identification period that follows a display driving period. As such, when a display driving operation and a fingerprint identification operation are performed in a time-division manner, the influence of the display driving operation on the fingerprint identification operation can be eliminated, that is, the influence on the fingerprint identification result from the voltage on the data line and sensing line can be eliminated.

18 Claims, 10 Drawing Sheets

600

S610 — Dividing a valid period of each display frame into a predetermined number of display driving periods, and one fingerprint identification period is set after at least one display driving period among the predetermined number of display driving periods, wherein a quantity of the fingerprint identification period is an integer equal to or greater than one S620 — during each display driving period, connecting the plurality of transmission lines to all columns of display pixels, and writing display data to at least one row of display pixels via the plurality of transmission lines, so that the at least one row of display pixels performs displaying according to the written display data S630 — during each fingerprint identification period, connecting a set of transmission lines among the at least a portion of the transmission lines to at least a part of the fingerprint sensing pixels, and reveiving fingerprint identification signals via the set of transmission lines S640 — during a predetermined time period before a start of each fingerprint identification period, connecting each of the set of transmission lines to one column of display pixels and one column of fingerprint sensing pixels corresponding to the transmission line, and setting voltages on the set of transmission lines to a predetermined DC voltage

FIG. 6

FINGERPRINT IDENTIFICATION METHOD FOR PANEL, ELECTRONIC DEVICE, AND CONTROL CIRCUIT

TECHNICAL FIELD

The present application relates to the field of display technology, and more particularly, to a fingerprint identification method for a panel, an electronic device, and a control circuit.

BACKGROUND

Fingerprint identification technology has been widely employed in various electronic devices, such as mobile phones, notebook computers, tablet computers, personal digital assistants, and portable electronic devices etc., and can be used to realize identity recognition.

The current electronic devices adopting fingerprint identification technology can adopt the schemes of partial screen region fingerprint identification and full-screen fingerprint identification. In the scheme of full-screen fingerprint identification, the fingerprint sensing region of the panel corresponds to the entire region of the panel, that is, all the fingerprint sensing pixels are arranged in the entire region of the panel, for example, all the fingerprint sensing pixels are divided into a plurality of fingerprint regions along a certain direction (e.g., column direction) of the panel, to perform fingerprint identification for a certain fingerprint region in combination with touch detection. In addition, since the panel also has the display function, the panel further includes a plurality of display pixels arranged in an array.

Due to size limitation and internal design of the panel, the display driving operation on the display pixels and the fingerprint identification operation based on the fingerprint sensing pixels will affect each other. Therefore, how to improve the accuracy of fingerprint identification is a problem to be solved.

It should be noted that contents of the "Background" section are used to facilitate understanding of the present invention. Some (or all) of what is disclosed in the "Background" section may not relate to conventional art known to one of ordinary skill in the art. The disclosure in the "Background" section does not imply that it would have been known to one of ordinary skill in the art before the filing of the present application.

SUMMARY

In view of this, in order to solve the problems of the prior art, the embodiments of the present application provide a fingerprint identification method for a panel, an electronic device, and a control circuit, which can reduce the influence on the fingerprint identification operation caused by the display driving operation.

According to one aspect of the present application, there is provided a fingerprint identification method for a panel, wherein the panel includes: display pixels arranged in an array, fingerprint sensing pixels arranged in an array within a fingerprint sensing region on the panel, and a plurality of transmission lines, each transmission line among at least a portion of the transmission lines being selectively connected with one column of display pixels and one column of fingerprint sensing pixels corresponding to the transmission line within the fingerprint sensing region, and the fingerprint identification method comprises: dividing a valid period of each display frame into a predetermined number of display driving periods, and setting one fingerprint identification period after at least one display driving period among the predetermined number of display driving periods, wherein, a quantity of the fingerprint identification period is an integer equal to or greater than one, during each display driving period, connecting the plurality of transmission lines to all columns of display pixels, and writing display data to at least one row of display pixels via the plurality of transmission lines, so that the at least one row of display pixels performs displaying according to the written display data, during each fingerprint identification period, connecting a set of transmission lines among the at least a portion of the transmission lines with at least a part of the fingerprint sensing pixels, and receiving fingerprint identification signals via the set of transmission lines, and during a predetermined time period before a start of each fingerprint identification period, connecting each transmission line among the set of transmission lines to one column of display pixels and one column of fingerprint sensing pixels corresponding to the transmission line, and setting voltages on the set of transmission lines to a predetermined DC voltage.

According to another aspect of the present application, there is provided an electronic device comprising: a panel and a control circuit, wherein, the panel includes: display pixels arranged in an array, fingerprint sensing pixels arranged in an array within a fingerprint sensing region on the panel, and a plurality of transmission lines, each transmission line among at least a portion of the transmission lines being selectively connected with one column of display pixels and one column of fingerprint sensing pixels corresponding to the transmission line within the fingerprint sensing region, the control circuit includes: a display driving circuit, configured to write display data to at least a part of rows of display pixels via the plurality of transmission lines during each display driving period, so that the at least a part of rows of display pixels performs displaying according to the written display data, and to set voltages on a set of transmission lines among the at least a portion of the transmission lines to a predetermined DC voltage during a predetermined time period before a start of each fingerprint identification period; a fingerprint identification control circuit, configured to receive fingerprint identification signals from at least a part of the fingerprint sensing pixels via the set of transmission lines during each fingerprint identification period, and generate a fingerprint identification result, the processor is configured to interact with the control circuit, to provide the control circuit with timing related information and display image information, and to obtain the fingerprint identification result, wherein the timing related information causes a valid period of each display frame to be divided into a predetermined number of display driving periods, and one fingerprint identification period to be set after at least one display driving period among the predetermined number of display driving periods, wherein, a quantity of the fingerprint identification period is an integer equal to or greater than one According to yet another aspect of the present application, a control circuit for a panel is provided, wherein the panel includes: display pixels arranged in an array, fingerprint sensing pixels arranged in an array within a fingerprint sensing region on the panel, and a plurality of transmission lines, each transmission line among at least a portion of the transmission lines being selectively connected with one column of display pixels and one column of fingerprint sensing pixels corresponding to the transmission line within the fingerprint sensing region, and the control circuit comprises: a display driving circuit, configured to write display data to at least a part of rows of display pixels via the plurality of transmission lines during each display driving period, so that the at least a part of rows of display pixels performs displaying according to the written display data, and to set voltages on a set of transmission lines among the at least a portion of the transmission lines to a predetermined DC voltage during a predetermined time period before a start of each fingerprint identification period; a fingerprint identification control circuit, configured to receive fingerprint identification signals from at least a part of the fingerprint sensing pixels via the set of transmission lines during each fingerprint identification period, wherein a valid period of each display frame is divided into a predetermined number of display driving periods, and one fingerprint identification period is set after at least one display driving period among the predetermined number of display driving periods, wherein, a quantity of the fingerprint identification period is an integer equal to or greater than one.

According to the above embodiments, the voltage on the data line that may affect a fingerprint identification result is set to a predetermined DC voltage during a predetermined period before a start of a fingerprint identification period that follows a display driving period. As such, when a display driving operation and a fingerprint identification operation are performed in a time-division manner, the influence of the display driving operation on the fingerprint identification operation can be eliminated, that is, the influence on the fingerprint identification result from the voltage on the data line can be eliminated.

BRIEF DESCRIPTION OF THE DRAWINGS

FIG. 6 shows a schematic flowchart of a fingerprint identification method for a panel according to an embodiment of the present application.

DETAILED DESCRIPTION OF THE EMBODIMENTS

The term "coupled (or connected)" is used broadly throughout the specification (including the claims) of the present application and encompasses both directly and indirectly connecting or coupling the components. For example, if the present disclosure describes that a first device is coupled (or connected) to a second device, it should be interpreted that the first device may be directly connected to the second device, or the first device may be indirectly connected to the second device via other devices or through certain coupling components. Terms such as "first" and "second" mentioned throughout the specification (including the claims) of the present application are only used to name elements/components or to distinguish between different embodiments or ranges, and are not intended to limit an upper limit or a lower limit of the number of elements/components, and are not intended to limit the order of elements/components. Furthermore, elements/components/steps with the same reference signs represent the same or similar parts in the figures and the embodiments. Relevant descriptions may be referenced for elements/components/steps with the same reference signs in different embodiments. An expression used in the singular may encompass the expression of the plural, and an expression used in the plural may also encompass the expression of the singular, unless it has been clearly defined in the context.

Figure 1:
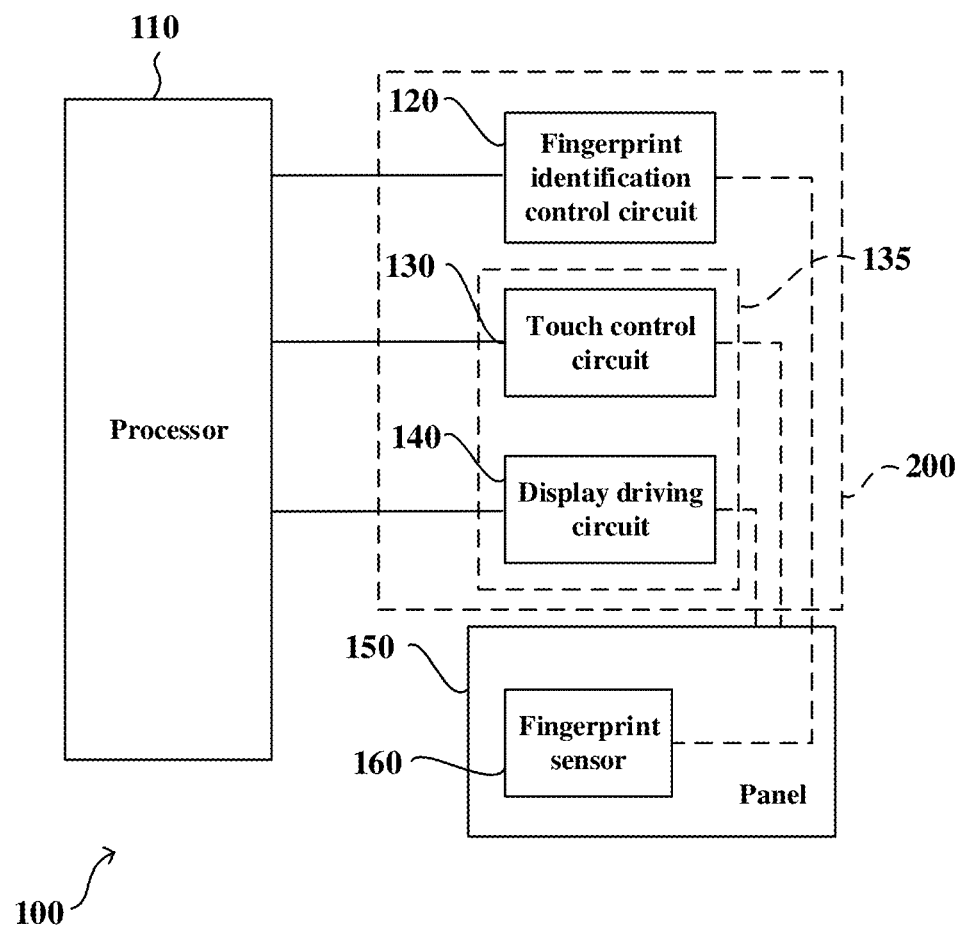
FIG. 1 shows a schematic circuit block diagram of an electronic device according to an embodiment of the present application.

FIG. 1 is a schematic circuit block diagram illustrating an electronic device 100 according to an embodiment of the present application. The electronic device 100 may be a mobile device or other non-mobile device. The electronic device 100 illustrated in FIG. 1 includes a processor 110, a fingerprint identification control circuit 120, a touch control circuit 130 (here, the electronic device having a touch detection function is taken as an example), a display driving circuit 140 and a panel 150 (a panel with a display function, a touch detection function, and a fingerprint identification function). It should be noted that even though the fingerprint identification control circuit 120, the touch control circuit 130, and the display driving circuit 140 are illustrated as different circuit blocks, a part of or an entirety of each block may be integrated with other one block (or two blocks) or all the other blocks. Based on design requirements, in some embodiments, a part of or all of the fingerprint identification control circuit 120, the touch control circuit 130 and the display driving circuit 140 may be embedded in a single chip or separated into different chips. The chip may communicate with the processor 110 and the control the panel 150.

Based on design requirements, in some embodiments, the processor 110 includes an application processor (AP), a central processing unit (CPU), a microcontroller or other processors (processing circuits). The processor 110 may be coupled to the display driving circuit 140 to provide image frame information. The display driving circuit 140 may be coupled (directly or indirectly) to the panel 150. The display driving circuit 140 may drive/control the display panel 150 to display an image in a display region (e.g., the full screen) of the panel 150.

Based on design requirements, the panel 150 may be a touch display panel. For example, the panel 150 may include a touch sensor (not shown). The touch control circuit 130 is coupled to (and controls) the touch sensor of the panel 150. The touch control circuit 130 may control touch detection on the panel 150 to obtain a touch region corresponding to an object (e.g., a finger) on the panel 150. The processor 110 is coupled to the touch control circuit 130 to receive the touch sensing signal.

The panel 150 may be any panel with a fingerprint identification function. The specific structure of the panel 150 is not limited in this embodiment. Based on design requirements, the panel 150 may be a display panel with an in-display fingerprint identification function. For example, in some embodiments, the panel 150 further includes a fingerprint sensor 160, and the fingerprint sensor 160 includes a plurality of fingerprint sensing pixels. Based on design requirements, the fingerprint sensor 160 may be an optical fingerprint sensor or other fingerprint sensor, such as a capacitive fingerprint sensor.

The fingerprint sensor 160 may be placed under the panel 150. Or alternatively, the fingerprint sensor 160 may be embedded in the panel 150. Implementation details of the panel 150 may be determined based on design requirements. For example, the fingerprint sensor 160 may be arranged in one of an on-display configuration, an under-display configuration, a local in-display configuration, and a global in-display configuration. Alternatively, the fingerprint sensor 160 may be arranged in another configuration.

A part (or all) of the display region of the panel 150 may serve as a fingerprint sensing region of the fingerprint sensor 160 for identifying fingerprint. In general, as the area of the fingerprint sensing region increases, the degree of freedom in the user's operation can be increased. A plurality of fingerprint sensing pixels may be arranged in the fingerprint sensing region. When the user presses the finger on any orientation of the fingerprint sensing region of the panel 150, the fingerprint sensor 160 may sense/identify the fingerprint of the user's finger. Based on design requirements, in some embodiments, the panel 150 may perform optical fingerprint identification, and the fingerprint sensor 160 of the panel 150 includes a plurality of optical fingerprint sensing pixels capable of sensing light.

The fingerprint identification control circuit 120 may be coupled to the fingerprint sensor 160 of the panel 150 to control the fingerprint sensing of the panel 150 and read the fingerprint identification signal. The processor 110 is coupled to the fingerprint identification control circuit 120 to receive the identification result. Based on design requirements, in some embodiments, the fingerprint identification control circuit 120, the touch control circuit 130 and the display driving circuit 140 may be different integrated circuits. In some other embodiments, the touch control circuit 130 and the display driving circuit 140 may be integrated in a touch with display driver integration (TDDI) chip (or a TDDI circuit 135), and the fingerprint identification control circuit 120 is implemented in another chip (or integrated circuit). The TDDI circuit 135 may control the touch detection operation and the display driving operation on the panel 150. In still other embodiments, the fingerprint identification control circuit 120 and the TDDI circuit 135 may be integrated in a single integrated circuit (chip) 200. The integrated circuit 200 may control the fingerprint identification of the panel 150 and control the touch detection operation and the display driving operation on the panel 150.

Usually, in order to reduce mutual influence between the display driving operation, the touch detection operation and the fingerprint identification operation, a driving method in a time-division manner can be adopted, that is, the display driving period, the touch detection period and the fingerprint identification period do not overlap in terms of time, or the display driving period and the touch detection period may overlap while the fingerprint identification period is in a different period so as to reduce the influence of display driving operation and touch detection operation on the fingerprint identification result. In addition, in a case where the panel has the touch detection function, the fingerprint identification period is generally set after the touch detection is completed, so that fingerprint identification can be performed only on a part of the fingerprint regions according to a touch position obtained by the touch detection, so as to reduce calculation processing amount.

Figure 2:
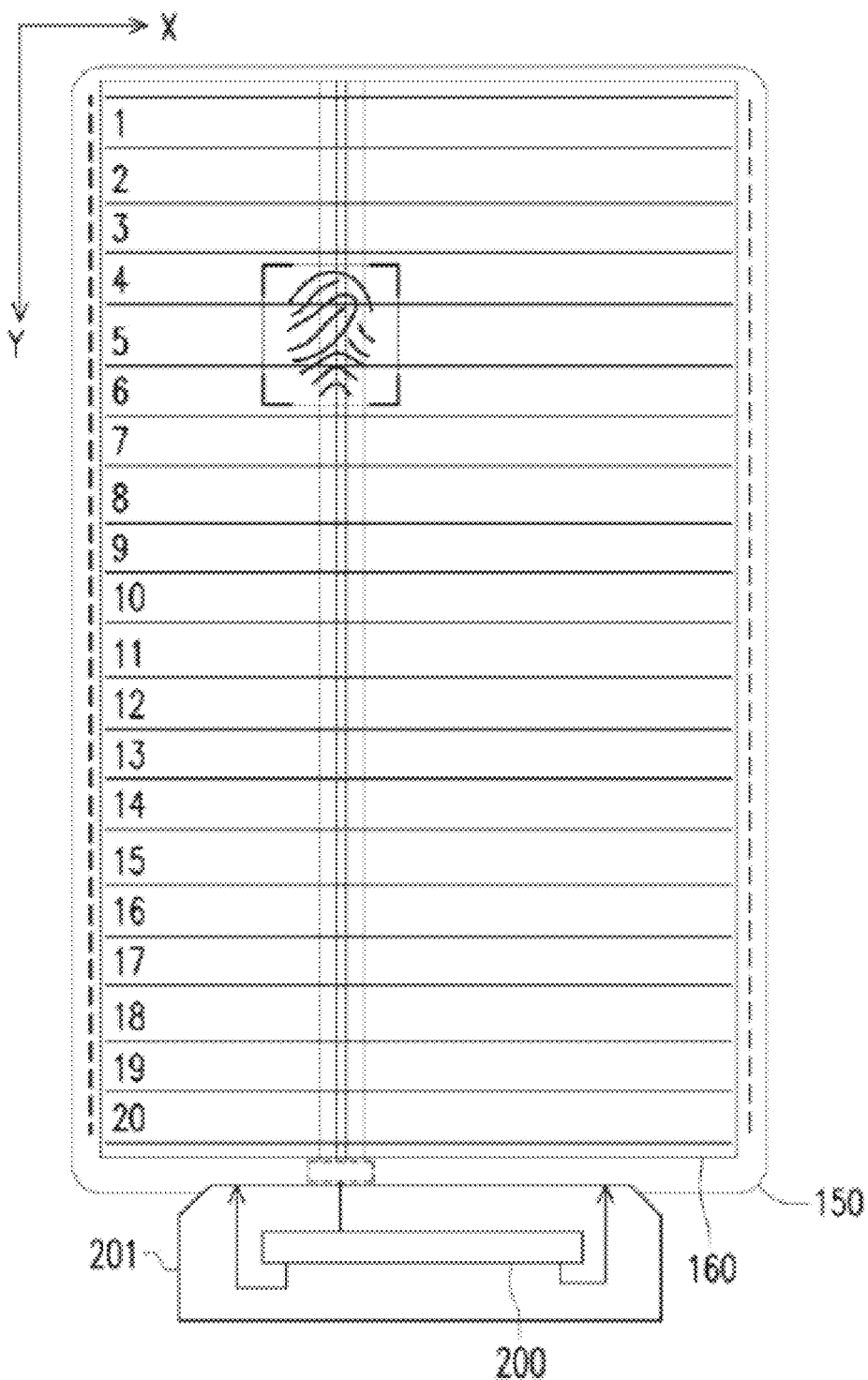
FIG. 2 shows a schematic diagram of layout of the panel and the fingerprint sensor depicted in FIG. 1 according to an embodiment of the present application.

FIG. 2 is a schematic diagram illustrating one type of layout of the panel 150 and the fingerprint sensor 160 depicted in FIG. 1 according to an embodiment of the present application. The fingerprint sensor 160 has a plurality of fingerprint sensing pixels, and these fingerprint sensing pixels form an array, as will be described later in conjunction with FIG. 3. A flexible circuit board 201 is electrically connected to the panel 150, and an integrated circuit 200 is disposed on the flexible circuit board 201. According to design requirements, one or more of the fingerprint identification control circuit 120, the touch control circuit 130 and the display driving circuit 140 may be configured in the integrated circuit 200. In the embodiment shown in FIG. 2, the region where the fingerprint sensor 160 is arranged becomes the fingerprint sensing region, and the fingerprint sensing region is divided into 20 fingerprint regions in the Y direction, and there is one fingerprint region in the X direction. Each fingerprint region has a plurality of rows, each row has a plurality of display pixels, and each display pixel is configured with a fingerprint sensing pixel. Of course, this is just an example, for example, the fingerprint sensor 160 may be divided into 10 fingerprint regions in the Y direction and 10 fingerprint regions in the X direction, that is, a total of 100 fingerprint regions, and similarly, each fingerprint region may include a plurality of rows, each row has a plurality of display pixels, and each display pixel is configured with a corresponding fingerprint sensing pixel. In addition, in some other layouts, the fingerprint sensing region where the fingerprint sensor 160 is arranged is not distributed on the entire region of the panel 150 as in FIG. 2, the fingerprint sensing region is only distributed on a partial region of the panel, and the partial region may also be similarly divided into a plurality of fingerprint regions.

Figure 3:
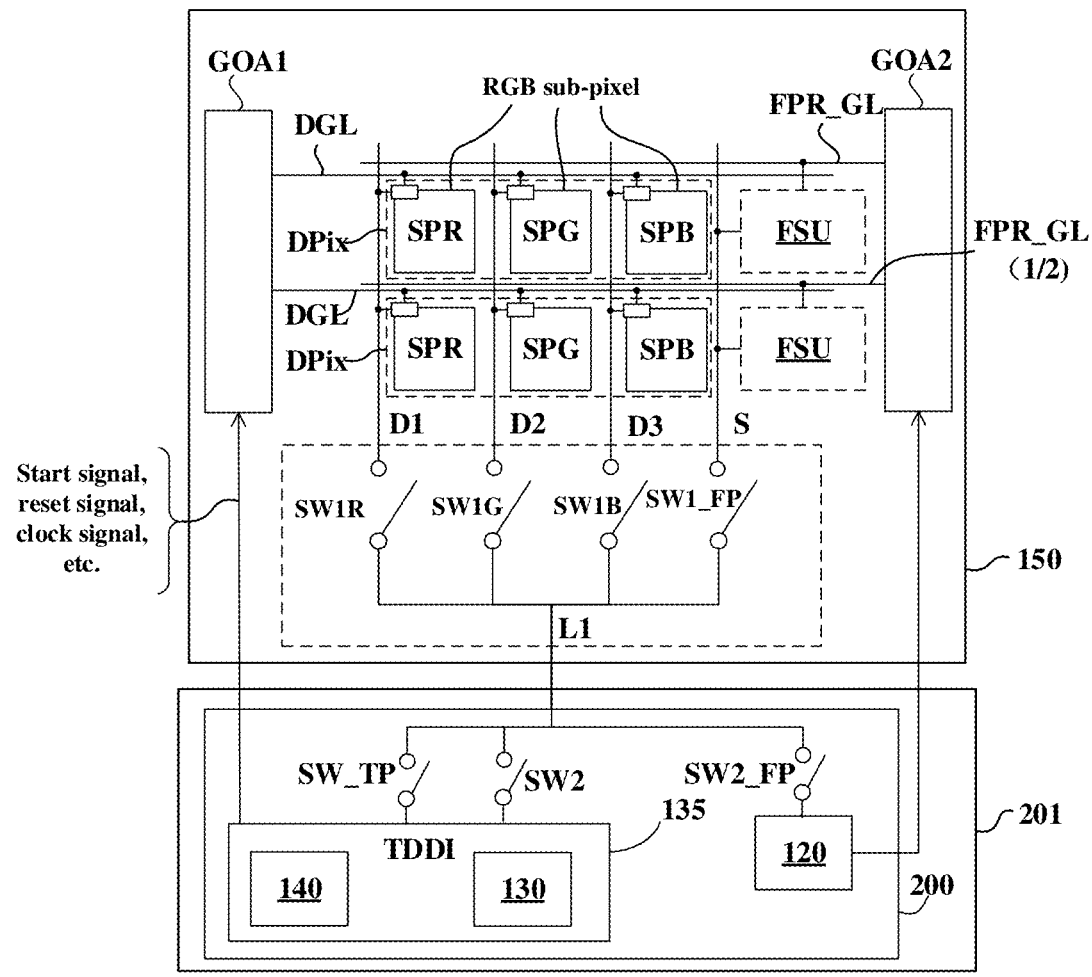
FIG. 3 shows a schematic diagram of partial layout of the panel depicted in FIG. 2 according to an embodiment of the present application.

For example, FIG. 3 is a schematic diagram illustrating a partial layout of the panel 150 shown in FIG. 2 according to an embodiment of the present application. In the embodiment shown in FIG. 3, the panel 150 has display pixels arranged in an array, each row has a plurality of display pixels DPix, and one display pixel DPix has a plurality of sub-pixels, such as a red sub-pixel SPR, a green sub-pixel SPG and a blue sub-pixel SPB (not limited thereto). FIG. 3 shows two display pixels DPix on the same column and two corresponding fingerprint sensing pixels FSU on the same column.

It should be noted that, in the embodiments of the present application, for the convenience of description, the direction of data lines on the panel is defined as the column direction, and the direction of gate lines is defined as the row direction. However, a person skilled in the art should understand that, in other embodiments, there may also be different definitions, as long as the connection with various pixels and the signal transmission can be realized.

One or more gate-on-array (GOA) circuits, such as a GOA circuit GOA1 of the panel 150 may be coupled to display pixels DPix (e.g., red sub-pixels SPR, green sub-pixels SPG, and blue sub-pixels SPB) via a plurality of gate lines DGL. The GOA circuit GOA1 scans the gate lines DGL of the display pixels DPix according to the control of the display driving circuit 140. The GOA circuit GOA1 may be implemented as one or more GOA circuit blocks. In addition, the GOA circuit GOA1 may be disposed on one side or two sides of the display panel.

Each display pixel DPix may be configured with one fingerprint sensing pixel FSU or may be arranged together with one fingerprint sensing pixel FSU (take full-screen fingerprint identification as an example). One or more GOA circuits, e.g., a GOA circuit GOA2 of the panel 150, may be coupled to fingerprint sensing pixels FSU via a plurality of gate lines (e.g., FPR_GL as shown may represent FPR_GL1 and FPR_GL2). The GOA circuit GOA2 scans the gate line FPR_GL1 and the gate line FPR_GL2 of each fingerprint sensing pixel FSU according to the control of the fingerprint identification control circuit 120. Furthermore, the GOA circuit GOA2 may be implemented as one or more GOA circuit blocks. In addition, the GOA circuit GOA2 may be disposed on one side or two sides of the display panel. Each of the gate lines FPR_GL may include wires for one or more fingerprint identification scan signals (collectively referred to as the fingerprint identification scan signal) in the fingerprint identification process, for example, based on circuit structure of the fingerprint sensing pixel shown in FIG. 4, each gate line FPR_GL may include a reset wire (e.g., corresponding to FPR_GL1) for transmitting the fingerprint identification scan signal FPR_GLi_RESET (shown in FIG. 4) and/or a select wire (e.g., corresponding to FPR_GL2) for transmitting the fingerprint identification scan signal FPR_GLi_SEL/WRITE (shown in FIG. 4).

In FIG. 3, there is a transmission line L1 between the integrated circuit 200 and the panel, and each transmission line can switch connections with a plurality of data lines (e.g., shown as three, D1 to D3, used for display driving) and one sensing line (S, used for fingerprint identification) through a switch module (such as switches SW1R, SW1G, SW1B (controlled by corresponding switch control signals CR_SW1R, CR_SW1G, CR_SW1B) and a switche SW1_FP (controlled by the corresponding switch control signal CR_SW1_FP)), and each data line is connected to one column of sub-pixels. Thus, the fingerprint identification control circuit 120, the touch control circuit 130 and the display driving circuit 140 (one or more of which may be configured in the integrated circuit 200) can provide display data to respective sub-pixels in each display pixel via the switches SW1R, SW1G, SW1B connected to the same transmission line, and can read the fingerprint identification signal (e.g., voltage or current signal) from the fingerprint sensing pixel corresponding to the display pixel through the switch SW1_FP connected to the same transmission line.

In the present application, for the convenience of description, a plurality of data lines and one sensing line connected to each transmission line via a switch module are referred to as data lines and sensing line corresponding to the transmission line; and one (column of) display pixel (for example, including three (columns of) sub-pixels) and one (column of) fingerprint sensing pixel which it is configured with are also considered to correspond to each other. One column of display pixels (e.g., three columns of sub-pixels) and one column of fingerprint sensing pixels connected to the data lines and the sensing line corresponding to each transmission line are also called one column of display pixels (e.g., three columns of sub-pixels) and one column of fingerprint sensing pixels corresponding to the transmission line. The data lines connected to the display pixels located outside the fingerprint sensing region may have no corresponding sensing line, that is, each of these display pixels does not have corresponding fingerprint sensing pixel.

In addition, for each column of display pixels and one corresponding column of fingerprint sensing pixels, that is, for each transmission line, another corresponding switch module (for example, internal or external to the integrated circuit 200 on the flexible circuit board 201) is also configured, for example, the touch control circuit 130, the display driving circuit 140 and the fingerprint identification control circuit 120 are switchably connected, via the touch control switch SW_TP, via the display driving control switch SW2, and via the fingerprint identification control switch SW2_FP, respectively, to a same transmission line corresponding to the data lines (e.g., 3 data lines for 3 sub-pixels) to which the column of display pixels is connected, so that each switch is turned on or off under the control of the control signals (CR_TP, CR_SW2 and CR_FP2 control) corresponding to each switch respectively. Therefore, the data or signal interaction required in the touch detection operation, the display driving operation and the fingerprint identification operation are performed in a time-division manner.

For example, during the touch detection period, in order to reduce mutual affect between the display driving operation and the touch detection operation, the signal on the gate lines and the data lines can be set to be consistent with the touch driving signal (i.e., the touch driving signal is also applied to the gate lines and the data lines, and the applied signal on the gate lines and the data lines is also referred to as a co-driving signal of the touch driving signal, but the amplitude of the co-driving signal is insufficient to turn on the gate of the transistor in the pixel circuit) or a high impedance state (Hi-Z). For example, the switch SW_TP can be turned on, SW1R, SW1G, SW1B can be turned on to apply the co-driving signal of the touch driving signal to the data line, or SW1R, SW1G, SW1B are turned off to keep the data lines in a high impedance state (Hi-Z). In addition, in order to avoid the influence of the fingerprint identification signal (for example, obtained from the fingerprint identification process at the end of the previous display frame) on the currently sensed touch detection signal, the switch SW1_FP for the fingerprint identification process may be turned on to apply the co-driving signal of the touch driving signal to the sensing line, or the switch SW1_FP may be turned off to achieve a high impedance state (Hi-Z). During the fingerprint identification period, the switch SW2_FP is turned on, SW1_FP is turned on, and the switches SW1R, SW1G, and SW1B on the data line are turned off, so as to obtain fingerprint identification signals (voltage or current signals) from the fingerprint sensing pixels.

Figure 4:
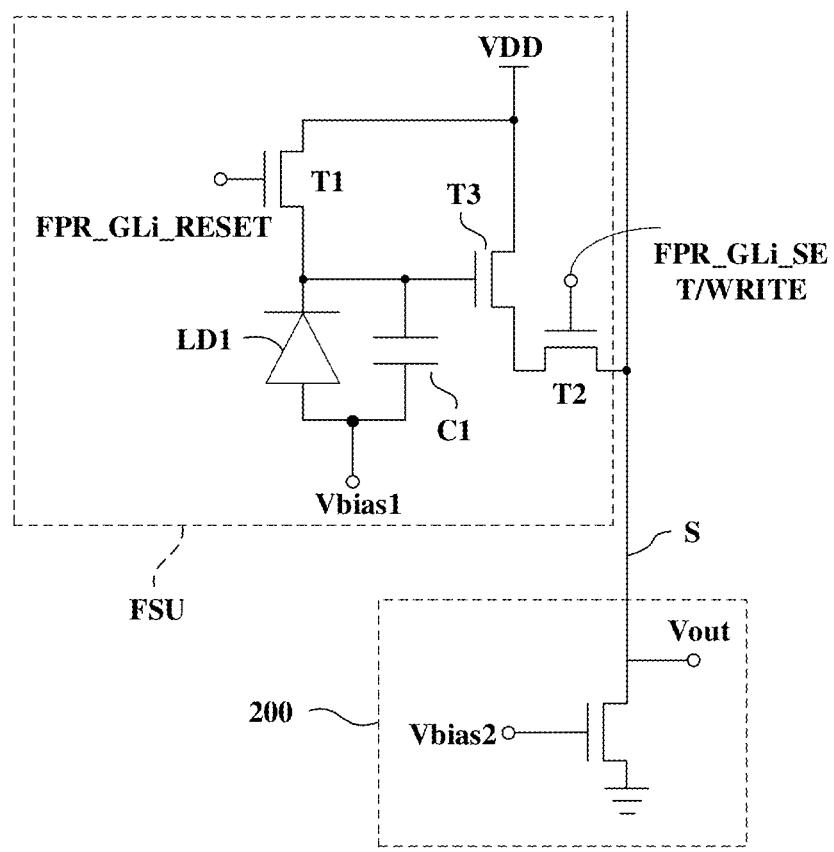
FIG. 4 is a schematic circuit diagram illustrating the fingerprint sensing pixel depicted in FIG. 3 according to an embodiment of the present application.

FIG. 4 is a schematic circuit diagram illustrating a fingerprint sensing pixel according to an embodiment of the present application. The fingerprint sensing pixel may be the fingerprint sensing pixel FSU shown in FIG. 3, but is not limited thereto. In the embodiment shown in FIG. 4, the fingerprint sensing pixel FSU includes a switch T1, a switch T2, a transistor T3, a capacitor C1 and a photodiode D1. The switch T1 is controlled by the scan signal FPR_GLi_RESET. The scan signal FPR_GLi_RESET is configured to control the corresponding fingerprint sensing pixel FSU to perform a reset operation. The switch T2 is controlled by the scan signal FPR_GLi_SEL/WRITE. The cathode of the photodiode D1 is coupled to the system voltage VDD via the switch T1. The anode of the photodiode D1 is coupled to the reference voltage Vbias1. Vbias2 shown in FIG. 4 is another reference voltage. A bias circuit for example including an N-type metal oxide semiconductor (NMOS) transistor controlled by the reference voltage Vbias2 may be coupled to the fingerprint pixel to draw current from the sense line SL. According to design requirements, the NMOS transistor controlled by the reference voltage Vbias2 may be implemented in the integrated circuit 200 or external to the integrated circuit 200. Of course, the fingerprint sensing pixel in FIG. 4 may adopt other circuit structures, which are not limited in the present disclosure.

The working process of pixel structure of the fingerprint sensing pixel depicted in FIG. 4 can be briefly described as follows.

In the first stage, the fingerprint scan signal FPR_GLi_RESET sequentially turns on the reset switch T1 of each fingerprint sensing pixel FSU (fingerprint sensing pixels in the same row use the same scan signal FPR_GLi_RESET), so the cathode of the photodiode D1 is reset to VDD (e.g., 5 volts).

In the second stage, the fingerprint scan signal FPR_GLi_RESET turns off the reset switch T1 and the voltage on the photodiode D1 is 5V. When the light used for fingerprint sensing irradiates on the fingerprint, a reflected light is generated. The reflected light illuminates the photodiode D1, which speeds up the discharge rate of the photodiode D1. The reflected light from the fingerprint peak is brighter, which makes a resistance of the photodiode D1 in the fingerprint sensing pixel FSU at the fingerprint peak lower, and the discharge rate at the cathode is relatively fast, resulting in a lower cathode voltage (e.g., about 2 volts). The reflected light from the fingerprint valley is dark, which makes the resistance of the photodiode D1 in the fingerprint sensing pixel FSU at the fingerprint valley larger, and in this case, the discharge rate at the cathode is slow, resulting in a large cathode voltage (e.g., about 3 volts).

In the third stage, the fingerprint scan signal FPR_GLi_SEL/WRITE sequentially turns on the switch T2 of the fingerprint sensing pixel FSU (the fingerprint sensing pixels in the same row use the same scan signal FPR_GLi_SEL/WRITE), and the cathode voltage of the photodiode D1 is transmitted to the fingerprint sensing line as the output voltage Vout. In this case, the analog front end (AFE) circuit of the fingerprint identification control circuit 120 can read the sensing result Vout1 (the output voltage Vout) of the fingerprint sensing pixel FSU through the switches SW1_FP and SW2_FP as shown in FIG. 3.

In the fourth stage, the fingerprint scan signal FPR_GLi_RESET turns on the reset switch T1, and the cathode of the photodiode D1 is reset to the system voltage VDD (e.g., 5V) again. The system voltage VDD is transmitted to the fingerprint sensing line as the output voltage Vout. In this case, the AFE circuit of the fingerprint identification control circuit 120 can read the reset result Vout2 (the output voltage Vout).

In the fifth step, the fingerprint identification control circuit 120 may subtract the sensing result Vout1 from the reset result Vout2 to obtain the fingerprint identification result.

Figure 5:
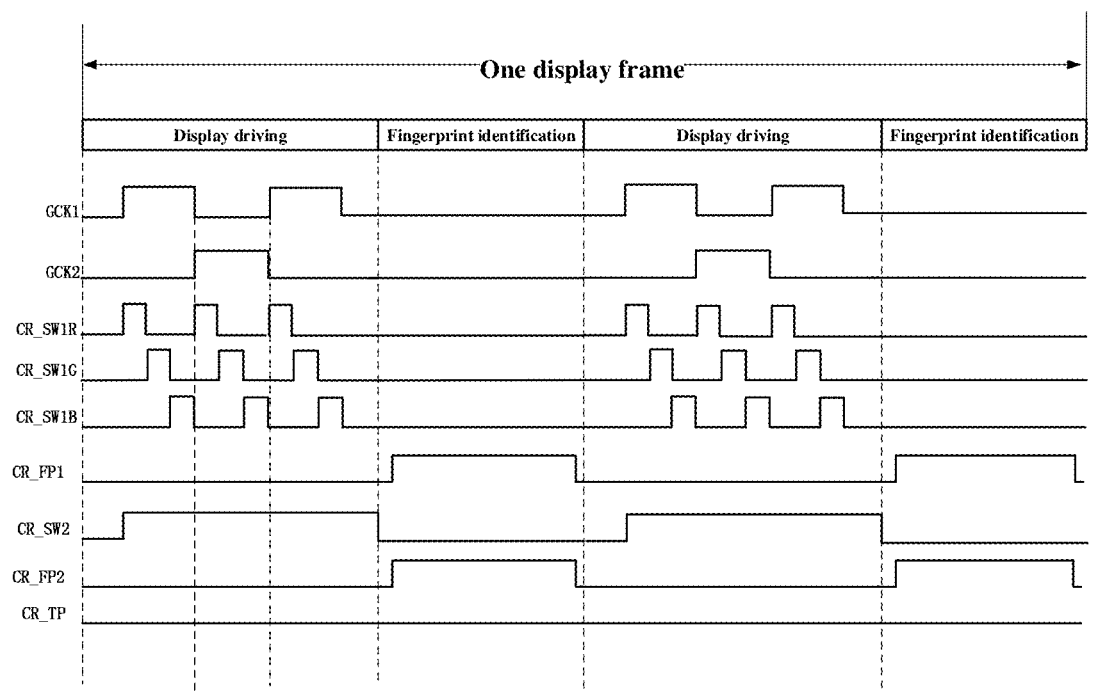
FIG. 5 shows a schematic timing diagram in a case where a fingerprint identification operation and a display driving operation are performed in a time-division manner in a display frame according to an embodiment of the present application.

FIG. 5 is a schematic timing diagram in a case where a fingerprint identification operation and a display driving operation are performed in a time-division manner in one display frame according to an embodiment of the present application. Optionally, the fingerprint operation may be performed during an idle period between two display frames, or may be performed during a frame skip period (that is, the next display frame time during which data writing is not required, and displaying is performed with the current data).

As shown in FIG. 5, in the display driving stage, for each display pixel and the corresponding fingerprint sensing pixel, the switch SW_TP (corresponding to application of the co-driving signal required in touch detection, and controlled by the switch control signal CR_TP) and the switch SW2_FP (corresponding to fingerprint identification, and controlled by the switch control signal CR_FP2) are turned off, the switch SW2 (corresponding to display driving, and controlled by the switch control signal CR_SW2) is turned on, and the gate driving circuit GOA sequentially applies the gate scan signals (for example, generated based on clock signals (such as the shown GCK1 and GCK2) set according to the structure of the GOA and a start pulse signal, etc.). During the period where a gate scan signal is applied to a gate line of each row of display pixels, the switches SW1R, SW1G, SW1B on the three data lines corresponding to each transmission line are turned on in a time-division manner to write display data to each display pixel in the row of display pixels in a time-division manner, so that these sub-pixels perform light-emitting displaying according to the written display data.

In the fingerprint identification stage, for each display pixel and the corresponding fingerprint sensing pixel, the switch SW_TP (corresponding to application of the co-driving signal required in touch detection), and the switches SW1R, SW1G, SW1B and switch SW2 (corresponding to display driving) are turned off, the switch SW2_FP (corresponding to fingerprint identification) is turned on, and the switch SW1_FP on the panel is turned on, so that a fingerprint identification signal (for example, voltage or current signal) can be read.

It can be seen that when entering the fingerprint identification stage, due to parasitic capacitance of the data lines, the voltage on each data line still maintains a voltage corresponding to the last written display data (for example, the display data is written to the display pixels in the N-th row at the end of the display driving period). In addition, when fingerprint sensing is performed on current fingerprint sensing pixel, the voltage corresponding to the previous fingerprint sensing signal may still remain on the sensing line. So, when entering the fingerprint identification period, each data line and/or the sensing line may be of different voltages, due to size constraints of the electronic device and arrangement of the fingerprint sensing pixels and the display pixels, etc., each sensing line is affected differently by the voltages on its corresponding data lines and/or the voltages on the adjacent data lines and sensing line, so that the fingerprint sensing signal read through each sensing line is affected differently, thus it may affect the fingerprint identification result (it has been experimentally verified that these different voltages will affect accuracy of the fingerprint identification result).

Although only the case where the fingerprint identification operation and the display driving operation are performed in a time-division manner is shown in FIG. 5, it should be understood that in a case where a touch detection operation is also included in a display frame, that is, in a case where the fingerprint identification operation, the touch detection operation and the display driving operation are performed in a time-division manner, or in a case where the display driving operation and the touch detection operation are performed simultaneously but they are performed in a time-division manner with the fingerprint identification operation, there will also be the situation where different voltages on the data lines and the sensing lines affect the fingerprint identification results.

Accordingly, the embodiments of the present application provide a fingerprint identification method for a panel, for eliminating the influence of the display driving operation on the fingerprint identification operation when the display driving operation and the fingerprint identification operation are performed in a time-division manner, and more specifically, for eliminating the influence on the fingerprint identification result caused by the voltages on the data lines and/or the sensing lines.

FIG. 6 shows a schematic flowchart of a fingerprint identification method for a panel according to an embodiment of the present application. The panel may be the panel as shown in FIG. 3 or may be a panel without a touch detection function. For example, the panel may include display pixels arranged in an array, fingerprint sensing pixels arranged in an array within a fingerprint sensing region on the panel, and a plurality of transmission lines with the same quantity as the columns of display pixels, each transmission line among at least a portion of the transmission lines (i.e., transmission lines which are capable of being connected to corresponding to the fingerprint sensing pixels within the fingerprint sensing region, and also can be referred to as "fingerprint sensing region-related transmission lines") being selectively connected with one column of display pixels and one column of fingerprint sensing pixels corresponding to the transmission line within the fingerprint sensing region, as shown in FIG. 3. A line connected to each column of sub-pixels of each column of display pixels is called a data line, and a line connected to each column of fingerprint sensing pixels is called a sensing line. For example, one transmission line L1 is shown in FIG. 3, the transmission line L1 may be connected to a column of red sub-pixels, a column of green sub-pixels and a column of blue sub-pixels in a column of display pixels through switches SW1R, SW1G, SW1B via data lines D1 to D3 respectively, and connected to a corresponding column of fingerprint sensing pixels through the switch SW1_FP via the sensing line S. In addition, since the fingerprint sensing region may only be located in a partial region of the panel, only some display pixels may be configured with corresponding fingerprint sensing pixels, that is, among the plurality of transmission lines corresponding to all data lines of all display pixels, only the at least a portion of the transmission lines may be selectively connected to the fingerprint sensing pixels. For the at least a portion of the transmission lines, each transmission line is selectively switchably connected to the corresponding three data lines and one sensing line through the switch module.

As shown in FIG. 6, in step S610, a valid period of each display frame is divided into a predetermined number of display driving periods, and one fingerprint identification period is set after at least one display driving period among the predetermined number of display driving periods, wherein a quantity of the fingerprint identification period is an integer equal to or greater than one.

Optionally, the predetermined number is an integer greater than or equal to one.

When the predetermined number is one, that is, each display frame includes only one display driving period, the display frame corresponds to only one fingerprint identification period, and in this case the fingerprint identification period may be set in an idle period between valid periods of two adjacent display frames, and it may also be set during a frame skip period (i.e., the next display frame time during which data writing is not required, and displaying is performed with the current data, serving as a hold frame).

When the predetermined number is an integer greater than one, that is, each display frame includes two or more display driving periods, in this case, if the display frame does not include a touch detection period, one fingerprint identification period may be set immediately after each display driving period, and the fingerprint identification period after the last display driving period may be set in an idle period between valid periods of two adjacent display frames, and it may also be set during a frame skip period (i.e., the next display frame time during which data writing is not required, and displaying is performed with the current data, serving as a hold frame).

If the display frame further includes a touch detection period, that is, the panel also has a touch detection function, the fingerprint region where the touch position is located can be determined based on the touch position, and fingerprint identification can be performed only on the determined fingerprint region. In this case, one touch detection period may be set immediately after each (or the only one) display driving period (time-divisional operations case), or the touch detection period may overlap with the display driving period (simultaneous operations case), the fingerprint identification period may be set immediately after that the touch detection is completed, and the fingerprint identification period may be set in an idle period between valid periods of two adjacent display frames, it may also be set during a frame skip period (i.e., the next display frame time during which data writing is not required, and displaying is performed with the current data).

In step S620, during each display driving period, the plurality of transmission lines are connected to all columns of display pixels, and display data is written to at least one row of display pixels via the plurality of transmission lines, so that the at least one row of display pixels performs displaying according to the written display data.

Optionally, in a case where one display frame includes only one display driving period, the gate scan signals are shifted in sequence during the display driving period, that is, pulses of the gate scan signals are sequentially applied to each row of display pixels, and during the driving period of each row of display pixels, display data is written to the row of display pixels through the plurality of transmission lines, so that the row of display pixels performs displaying according to the written display data.

Optionally, in a case where one display frame includes more than two display driving periods, only a part of the rows of display pixels are display driven during each display driving period, and during the driving period of each row of display pixels of the part of the rows of display pixels, display data is written to the row of display pixels through the plurality of transmission lines, so that the row of display pixels perform displaying according to the written display data.

Optionally, each display pixel includes a plurality of (for example, three ones of red, green, and blue) sub-pixels, and each sub-pixel is connected to one corresponding data line, that is, each data line is connected to one column of sub-pixels, for example, as shown in FIG. 3, the data line D1 is connected to one column of red sub-pixels, the data line D2 is connected to one column of green sub-pixels, and the data line D3 is connected to one column of blue sub-pixels. Therefore, when writing display data to each row of display pixels via the plurality of transmission lines, each transmission line among the plurality of transmission lines is switchably connected to, for example, three data lines corresponding to one column of display pixels in a time-division manner (for example, by controlling switches SW1R, SW1G, and SW1B in FIG. 3) so as to write the display data for each sub-pixel in the current row.

In step S630, during each fingerprint identification period, a set of transmission lines among the at least a portion of the transmission lines is connected with at least a part of the fingerprint sensing pixels, and fingerprint identification signals are received via the set of transmission lines.

Optionally, the at least a portion of the transmission lines are transmission lines corresponding to the sensing lines to which the fingerprint sensing pixels in the fingerprint sensing region are connected (i.e., fingerprint sensing region-related transmission lines which represent all the transmission lines in case of full-screen fingerprint identification, and represent partial transmission lines in case of partial-screen fingerprint identification), and are used for receiving fingerprint identification signals. If one display frame corresponds to only one fingerprint identification period, and the fingerprint region where the touch position in the fingerprint sensing region is located has been determined by touch detection before the fingerprint identification period, the fingerprint identification can be performed only for the fingerprint region. In this case, in the fingerprint identification period, the fingerprint identification for the fingerprint sensing pixels in the fingerprint region need to be completed, so it is possible to connect transmission lines corresponding to the fingerprint sensing pixels in the determined fingerprint region among the at least a portion of the transmission lines (i.e., fingerprint sensing region-related transmission lines, corresponding to the entire fingerprint sensing region) with the fingerprint sensing pixels in the fingerprint region or connect more transmission lines among the at least a portion of the transmission lines with more fingerprint sensing pixels (these transmission lines to be connected to the fingerprint sensing pixels are also referred to as the "a set of transmission lines among the at least a portion of the transmission lines"), so as to obtain fingerprint identification signals for these fingerprint sensing pixels.

If one display frame corresponds to more than two fingerprint identification periods, fingerprint identification of only a part of the rows of fingerprint sensing pixels can be completed during each fingerprint identification period (for example, the fingerprint identification scan signal scans only a part of the rows), but due to that each column of fingerprint sensing pixels shares the same one sensing line, so the at least a portion of the transmission lines (i.e., fingerprint sensing region-related transmission lines) are still required to obtain fingerprint identification signals for the fingerprint sensing pixels on this part of the rows. Alternatively, if one display frame corresponds to more than two fingerprint identification periods, fingerprint identification of all rows of fingerprint sensing pixels may also be completed during each fingerprint identification period.

In step S640, during a predetermined time period before a start of each fingerprint identification period, each transmission line among the set of transmission lines is connected to one column of display pixels and one column of fingerprint sensing pixels corresponding to the transmission line, and voltages on the set of transmission lines is set to a predetermined direct-current (DC) voltage.

For example, before entering the fingerprint identification period, the voltages on the set of transmission lines are set to the same DC voltage, and by connecting each of the set of transmission lines with its corresponding data lines and sensing line, respectively, the voltages on the corresponding data lines and sensing line are set to a predetermined DC voltage, so that the influence on the fingerprint identification result can be reduced. Optionally, in the case where the touch position can be determined, only the set of transmission lines corresponding to the sensing lines connected with the fingerprint sensing pixels in the fingerprint region where the touch position is located may be set to the predetermined DC voltage, so as to reduce the influence on the fingerprint sensing signals caused by the voltages on the sensing lines connected respectively with the fingerprint sensing pixels and the corresponding data lines, but considering that the voltages on the data lines or the sensing lines connected with adjacent display pixels or fingerprint sensing pixels may also affect current fingerprint sensing signals, thus, more transmission lines (and their corresponding data lines and sensing lines) can also be set to the predetermined DC voltage, the voltages on the transmission lines corresponding to all the sensing lines connected with the fingerprint sensing pixels within the entire fingerprint sensing region may be set to the predetermined DC voltage even when for example the touch position is not determined.

For example, as described above, when applying the predetermined DC voltage, four switches (switches SW1R, SW1G, SW1B and switch SW1_FP) on each transmission line (shown as L1 in FIG. 3) to which the predetermined DC voltage needs to be applied may be all turned on, and by applying the predetermined DC voltage (for example, a ground voltage or a DC voltage of other values) to the transmission line, the voltages on each data line and the sensing line corresponding to the transmission line are set to have the same DC voltage value, so as to reduce the impact on the fingerprint identification result obtained during the subsequent fingerprint identification period.

Optionally, when the four switches (switches SW1R, SW1G, SW1B, and switch SW1_FP) connected to each transmission line are controlled to be turned on, the four switches can be turned on simultaneously, or the four switches can be turned on in a time-division manner. In this case, a time length of the predetermined time period before a start of the fingerprint identification period may be the minimum time length of a period required to complete the operation of turning on the four switches and successfully applying the predetermined DC voltage, or may be greater than the minimum time length.

More details of the method described with reference to FIG. 6 will be described in detail later with reference to FIGS. 7 to 11. Specifically, the embodiments shown in FIGS. 7 to 8 correspond to the case where the panel does not have the touch detection function; the embodiments shown in FIGS. 9 to 11 correspond to the case where the panel has the touch detection function.

In the fingerprint identification method for a panel having a display function and a fingerprint identification function and optionally a touch detection function described with reference to FIG. 6, before entering the fingerprint identification period, the voltages on the fingerprint identification-related data lines and sensing lines that may have different voltages are set to a same DC voltage, which can reduce the influence on the fingerprint identification operation, thereby improving accuracy of the fingerprint identification result.

The fingerprint identification method described with reference to FIG. 6 will be described in more detail below with reference to FIGS. 7 to 8.

Figure 7:
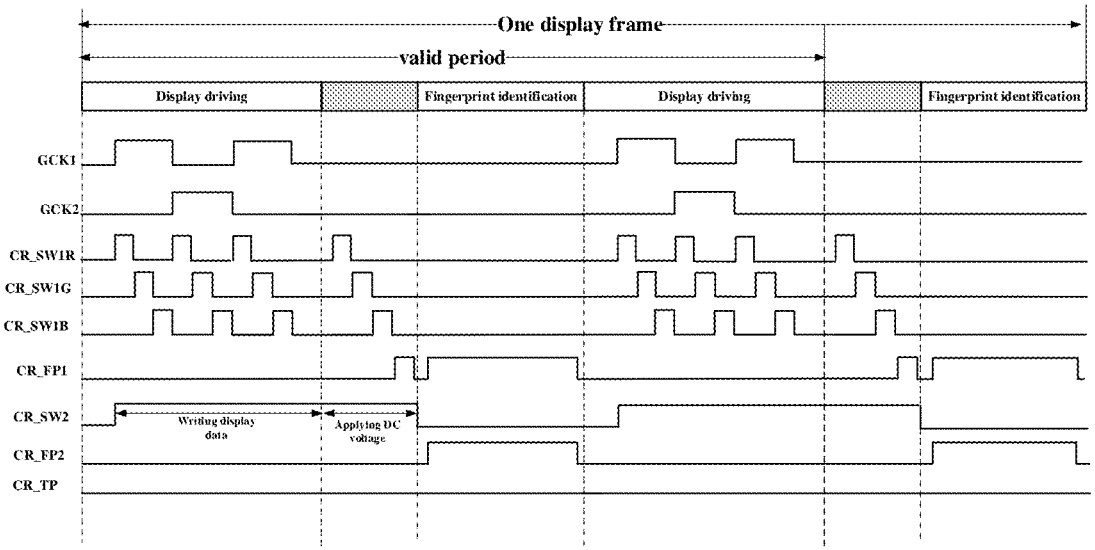
FIGS. 7 to 12 show schematic timing diagrams of example embodiments of the fingerprint identification method described with reference to FIG. 6 according to an embodiment of the present application.
Figure 8:
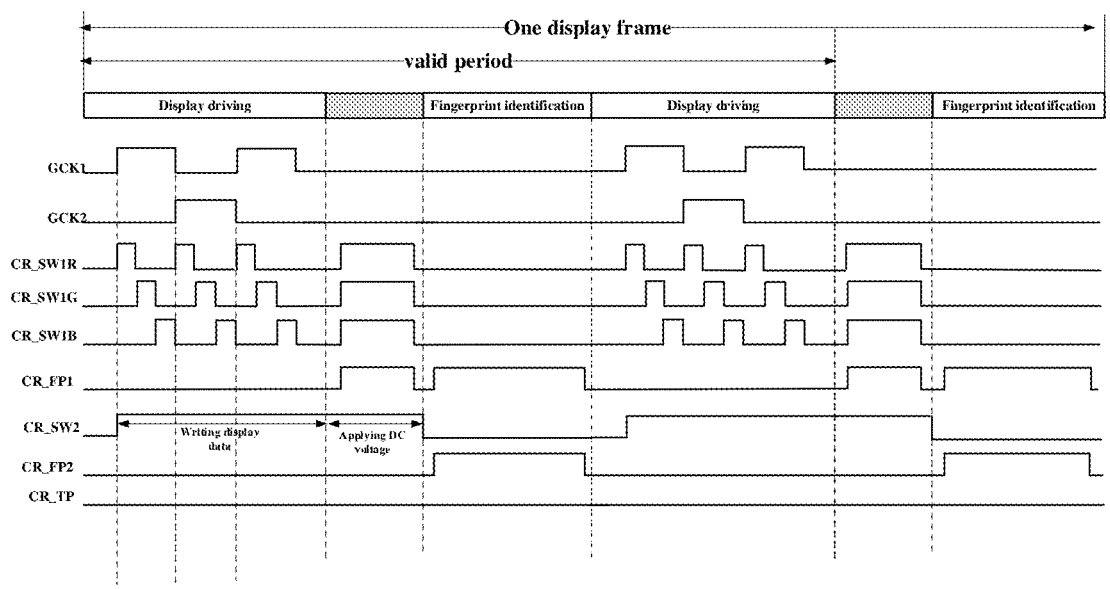

FIGS. 7 to 8 illustrate schematic timing diagrams of example embodiments of the fingerprint method described with reference to FIG. 6.

In the embodiment shown in FIGS. 7 to 8, the panel does not have a touch detection function, therefore, the fingerprint identification period does not have to be set after the touch detection operation ends (e.g., the display frame ends), and each display frame may be divided into at least one display driving period (i.e., the predetermined number is greater than or equal to one), and one fingerprint identification period is set immediately after a predetermined time interval from an end of each display driving period, wherein the predetermined time period is included in the predetermined time interval.

As shown in FIG. 7, as an example, the display frame includes two display driving periods and two fingerprint identification periods that are interleaved, optionally, the latter fingerprint identification period may be located in the idle period after the valid period of the display frame ends, or within the next skip frame (hold frame). The predetermined time interval between the display driving period and the fingerprint identification period may allow the operation of turning on the four switches (SW1R, SW1G, SW1B, SW_FR1) on each of the fingerprint sensing region-related transmission lines and successfully applying the predetermined DC voltage to be completed.

As shown in FIG. 7, during the first display driving period, the plurality of transmission lines of the panel are connected to all columns of display pixels, but not to the fingerprint sensing pixels. The gate scan signals are sequentially shifted (e.g., based on clock signals GCK1 and GCK2) from the first row of display pixels to the n-th (n is less than the total number of rows N) row of display pixels, and when shifted to each row of display pixels, each display pixel of the row of display pixels can be written with display data. For each display pixel, the switches SW1R, SW1G, and SW1B on the data lines connected to its sub-pixels are turned on (the switch control signals CR_SW1R, CR_SW1G, and CR_SW1B are shown as high level in FIG. 7) in a time-division manner, the switch SW2 on the transmission line corresponding to these data lines which the display pixel is connected to is turned on (the switch control signal CR_SW2 is shown as high level in FIG. 7), the switches SW1_FR and SW2_FR (corresponding to fingerprint identification) on the transmission line corresponding to these data lines are turned off (the switch control signals CR_FR1 and CR_FR2 are shown as low level) and the switch SW_TP on the transmission line corresponding to these data lines is turned off (the application of co-driving signals during touch detection is not included, and the switch control signal CR_TP is shown as low level), so as to write display data to its sub-pixels via the transmission line and the data lines. For example, if the panel has 1920 rows and 1280 columns of display pixels, when the 100th row is scanned, the total 1280 transmission lines of the 1st to 1280-th columns are simultaneously respectively connected in a first sub-period to all corresponding data lines to which all columns of red sub-pixels are connected, simultaneously respectively connected in a second sub-period to all corresponding data lines to which all columns of green sub-pixels are connected, and simultaneously respectively connected in a third sub-period to all corresponding data lines to which all columns of blue sub-pixels are connected.

Thereafter, during the first predetermined time interval (the gray period in FIG. 7) after the first display driving period, since the panel does not have a touch detection function, the touch position is not determined, so the at least a portion of the transmission lines (i.e., fingerprint sensing region-related transmission lines, corresponding to the entire fingerprint sensing region) may be connected with the corresponding data lines and sensing lines, and the shifting of the gate scan signals is suspended. For each transmission line among the at least a portion of the transmission lines, the switches SW1R, SW1G, SW1B on its corresponding data lines and the switch SW1_FR on the sensing line are turned on in a time-division manner (the switch control signal CR_SW1R, CR_SW1G, CR_SW1B, and CR_FR1 are sequentially shown as high level in FIG. 7), the switch SW2 on the transmission line is turned on (the switch control signal CR_SW2 is shown as high level in FIG. 7), and the switch SW2_FR on the transmission line is turned off (the switch is corresponding to fingerprint identification, and the switch control signal CR_FR2 in FIG. 7 is shown as low level) and the switch SW_TP on the transmission line is turned off (the application of co-driving signals during touch detection is not included, and the switch control signal CR_TP is shown as low level), so that a predetermined DC voltage is applied via the transmission line to the data lines and the sensing line corresponding to the transmission line.

During a first fingerprint identification period, the at least a portion of the transmission lines (i.e., fingerprint sensing region-related transmission lines, corresponding to the entire fingerprint sensing region) are respectively connected to their corresponding sensing lines, that is, connected to all fingerprint sensing pixels on the corresponding sensing lines, and receive, row by row and via the at least a portion of the transmission lines, fingerprint identification signals sensed by at least one row of fingerprint sensing pixels. For example, in this fingerprint identification stage, shifting of the gate scan signals is suspended, and the fingerprint identification scan signals (may also generated based on a clock signal, a start pulse signal, etc., not shown) start to be shifted sequentially row by row, for the fingerprint sensing pixels arranged in an array within the fingerprint sensing region. For each transmission line among the at least a portion of the transmission lines, the switches SW1R, SW1G, SW1B on its corresponding data lines are turned off (the switch control signals CR_SW1R, CR_SW1G, CR_SW1B are shown as low level in FIG. 7), and the switch SW1_FR on its corresponding sensing line is turned on (the switch control signal CR_FR1 is shown as high level in FIG. 7), the switch SW2 connected to the transmission line is turned off (the switch control signal CR_SW2 in FIG. 7 is shown as low level, for stopping supplying of the display data or the predetermined DC voltage to the data lines and/or the sensing line), the switch SW2_FP connected to the transmission line is turned on (the switch control signal CR_FR2 is shown as high level in FIG. 7, for receiving the fingerprint identification signals), and the switch SW_TP connected to the transmission line is turned off (application of co-driving signals during touch detection is not included, and the switch control signal CR_TP is shown as low level).

Thereafter, in a second display driving period, the gate scan signals are shifted sequentially from the (n+1)-th row to the N-th row of display pixels, and the control manner of respective switches and the connection manner of the transmission lines and the data lines are the same as those during the first display driving period.

Optionally, the end of the second display driving period may correspond to the end of the valid period of the display frame, and the second predetermined time interval and the second fingerprint identification period will be set in the idle period between the valid period of the display frame and the valid period of the next display frame, or in the frame skip after the display frame; alternatively, when the second display driving period ends, the valid period of the display frame does not end, at this time, the second predetermined time interval and optionally at least a part of the second fingerprint identification phase may still be included in the valid period of the display frame.

The control manner of respective switches and the connection manner of the transmission lines and the data lines during the second predetermined time interval are the same as those during the first predetermined time interval. During the second fingerprint identification period, the fingerprint identification scan signals are shifted sequentially for the remaining rows of fingerprint sensing pixels, and the control manner of respective switches and the connection manner of the transmission lines and the data lines are the same as those during the first fingerprint identification period.

The embodiment of FIG. 8 is similar to the embodiment described with reference to FIG. 7, the difference is that, in the embodiment shown in FIG. 8, during each predetermined time interval, each transmission line of the at least a portion of the transmission lines (i.e., fingerprint sensing region-related transmission lines, corresponding to the entire fingerprint sensing region) is connected with its corresponding data lines and the sensing line simultaneously (instead of the connection in a time-division manner in FIG. 7), so as to simultaneously apply the predetermined DC voltage to the corresponding data lines and the sensing line.

In the embodiments shown in FIGS. 7 and 8, by adding a predetermined time interval between each display driving period and the fingerprint identification period, the voltage on each data line and the sensing line that may affect the fingerprint identification result can be set to the predetermined DC voltage before the fingerprint identification period, which can reduce the influence on the fingerprint identification operation, thereby improving accuracy of the fingerprint identification result.

FIGS. 9 to 12 illustrate schematic timing diagrams of an example embodiment of the fingerprint identification method described with reference to FIG. 6.

In the embodiments shown in FIGS. 9 to 12, the panel has a touch detection function, and in this case, the panel is further configured with a plurality of touch sensors. The fingerprint identification period is set after the touch detection operation ends, and after the fingerprint region where the touch position is located can be determined.

Figure 11:
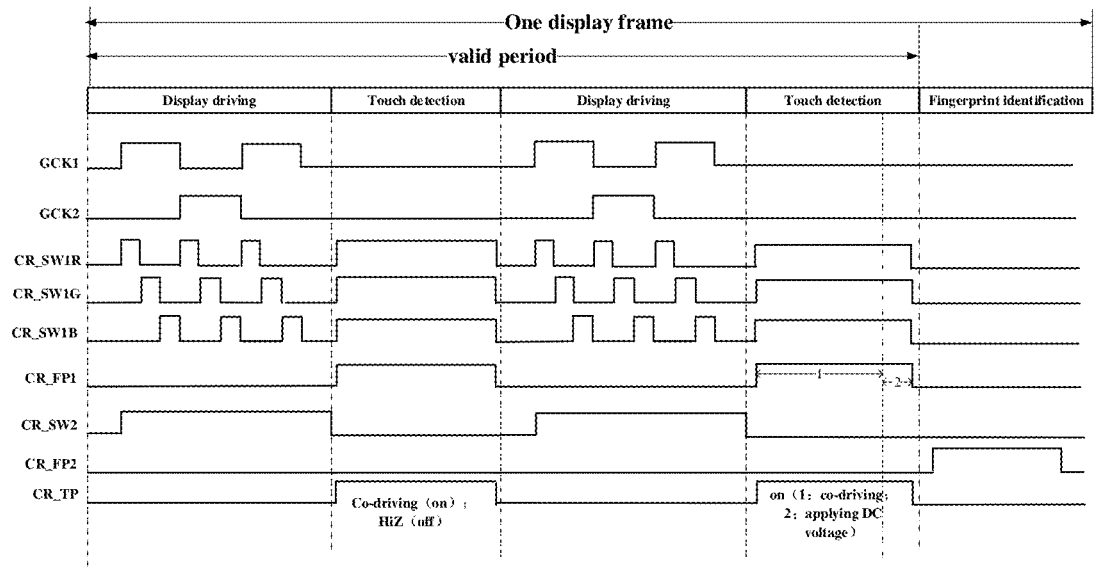
Figure 12:
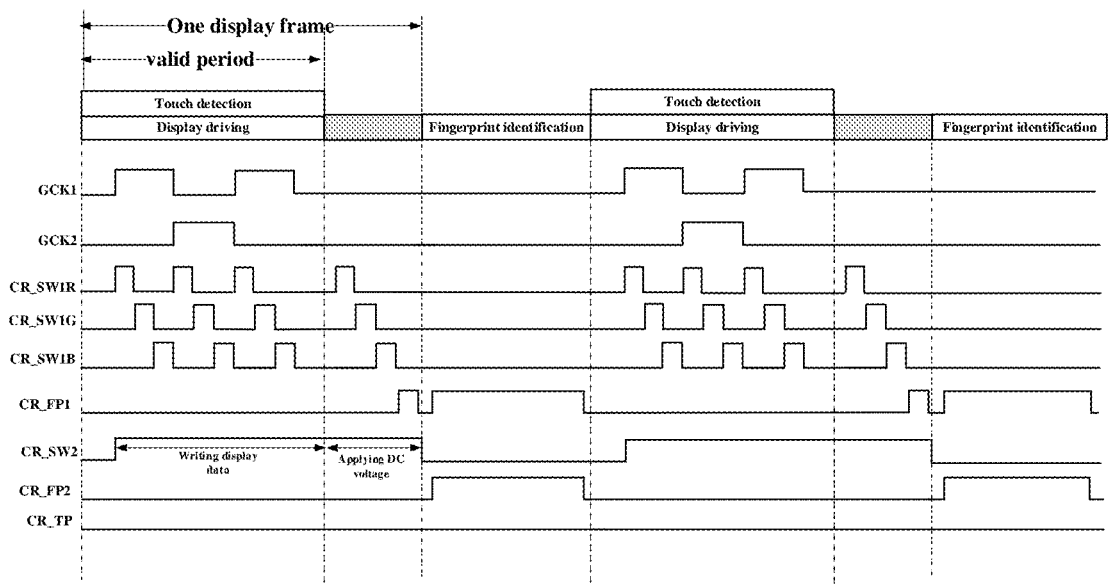

In this way, each display frame may be divided into at least one display driving period (i.e., the predetermined number is greater than or equal to one) and at least one touch detection period (corresponding to the embodiments shown in FIGS. 9 to 11) that are interleaved, or each display frame includes one display driving period and one touch detection period that overlap, that is, the display driving operation and the touch detection operation are simultaneously performed in the display frame (corresponding to the embodiment shown in FIG. 12).

During the fingerprint identification period, fingerprint identification can be performed directly on all the fingerprint sensing pixels without firstly determining the fingerprint region, that is, during the fingerprint identification period (only one fingerprint identification period), the at least a portion of transmission line (i.e., fingerprint sensing region-related transmission lines, corresponding to the entire fingerprint sensing region) are connected with all the fingerprint sensing pixels respectively through corresponding sensing lines, and receive, row by row and via the at least a portion of the transmission lines, the fingerprint identification signals sensed by all the fingerprint sensing pixels.

However, in order to speed up the identification rate and reduce the computational processing amount, fingerprint identification can be only performed on the fingerprint region where the touch position is located. Thus, as a further limitation to the fingerprint identification method described in FIG. 6, the fingerprint identification method may further include: acquiring touch detection signals of each touch detection period; based on the touch detection signals, determining a fingerprint region where a touch position is located, wherein fingerprint sensing pixels within the fingerprint region are of M rows and N columns, both M and N being integers greater than or equal to one and less than or equal to a total number of rows and a total number of columns of the array of the fingerprint sensing pixels, respectively.

In this way, during the fingerprint identification period, the fingerprint identification signals will only be received for the M rows and the N columns of fingerprint sensing pixels, that is, during the fingerprint identification period, N transmission lines corresponding to the N columns of fingerprint identification pixels are connected to all fingerprint sensing pixels corresponding to the N transmission lines; and the fingerprint identification signals sensed by the M rows and N columns of fingerprint sensing pixels in the determined fingerprint region are received row by row and via the N transmission lines for the M rows of fingerprint sensing pixels.

Figure 9:
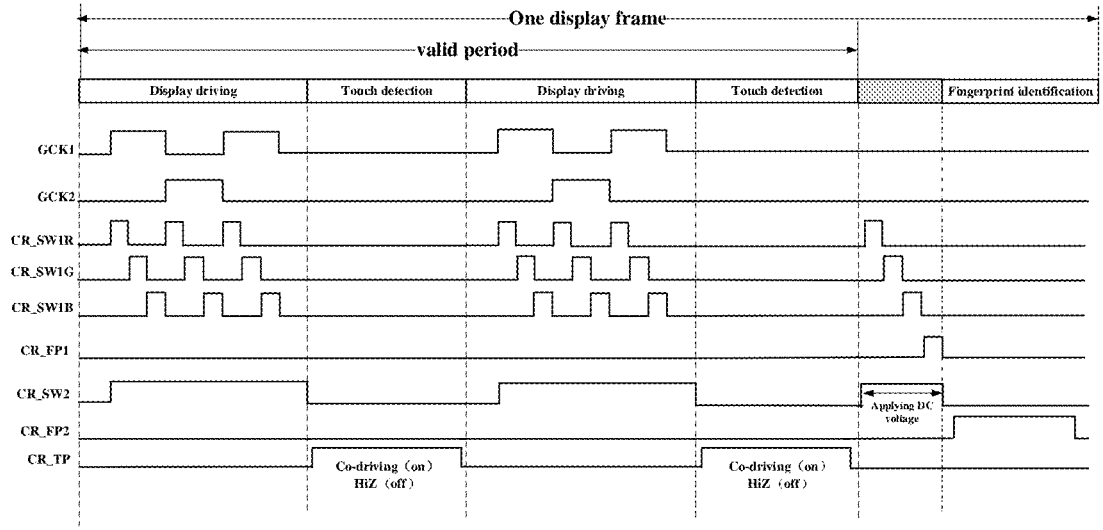

In the embodiment shown in FIG. 9, one touch detection period (shown in FIG. 9) is set immediately after each display driving period, or one touch detection period (not shown in FIG. 9) is set immediately after each display driving period other than the last display driving period, wherein during each touch detection period, touch detection is performed for at least a part of the plurality of touch sensors, and the valid period of each display frame ends with a display driving period (not shown in FIG. 9) or a touch detection period (shown in FIG. 9), or the touch detection period may also be set in the idle period after the end of the valid period of the display frame. Thereafter, one fingerprint identification period is set immediately after a predetermined time interval from the end of the last display driving period or the last touch detection period of each display frame, wherein the predetermined time period is included in the predetermined time interval.

As shown in FIG. 9, as an example, the display frame includes two display driving periods and two touch detection periods that are interleaved, and a fingerprint identification period is set immediately after a predetermined time interval from the end of the latter touch detection period. Optionally, the fingerprint identification period may be within the idle period between the valid period of the display frame and the valid period of the next display frame, or within the next frame skip (hold frame). The predetermined time interval may allow completion of the operation of turning on the four switches and successfully applying the predetermined DC voltage.

As shown in FIG. 9, the operations of respective switches involved in the first display driving period and the connection manners of the transmission lines and the data lines/sense lines are similar to those during the first display driving period in the embodiment described above with reference to FIG. 7, so no repetition is made here.

Thereafter, during the first touch detection period after the first display driving period, shifting of the gate scan signals is suspended, and touch detection is performed for at least a part of touch sensors of the plurality of touch sensors. And as mentioned above, in a case where the display driving operation and the touch detection operation are performed in a time-division manner, the co-driving signal of the touch driving signal may be applied to the data lines and the sensing line, or the data lines and the sensing line may be set to a high impedance state, in order to reduce the influence of the display driving operation or the previous fingerprint identification signal on the touch detection operation at that time, in the case of application of the co-driving signal, for each transmission line, the switches SW_TP, SW1R, SW1G, SW1B and the switch SW1_FR connected thereto may be turned on, and the switch SW2 (corresponding to display driving) and the SW2_FP (corresponding to fingerprint identification) connected thereto may be turned off, or in the case of high impedance state, the switches SW_TP, SW1R, SW1G, SW1B and SW1_FR connected thereto may also be turned off.

Next, in the second display driving period, the gate scan signals continue to shift sequentially, and the control manners of respective switches and the connection manners of the transmission lines and the data lines are the same as those during the first display driving period. At the end of the second display driving stage, the gate scan signals scan to the last row of display pixels.

In the second touch detection period, touch detection will continue to be performed on the remaining touch sensors, and the operations of the involved respective switches and the connections of the transmission lines and the data lines/sensing lines are similar to those during the first touch detection period.

After the second touch detection period ends, the touch position can be determined based on the touch detection signal, and thus the fingerprint region where the touch position is located can be determined. In this way, one fingerprint identification period is set immediately after the predetermined time interval from the end of the second touch detection period.

Similarly, during the predetermined time interval, optionally, each of transmission lines corresponding to the fingerprint sensing pixels in the fingerprint region where the touch position is located or more transmission lines is connected to its corresponding data lines and the sensing line in a time-division manner. For example, for each transmission line among these transmission lines, the switches SW1R, SW1G, and SW1B on its corresponding data lines and the corresponding switch SW1_FR on its corresponding sensing line are turned on in a time-division manner (the switch control signals CR_SW1R, CR_SW1G, CR_SW1B and CR_FR1 are sequentially shown as high level in FIG. 9), the switch SW2 on the transmission line is turned on (the switch control signal CR_SW2 is shown as high level in FIG. 9), and the switch SW2_FR (corresponding to fingerprint identification) on the transmission line is turned off (the switch control signal CR_FR2 in FIG. 9 is shown as low level) and the switch SW_TP on the transmission line is turned off (the switch control signal CR_TP is shown as low level), so as to apply via the transmission line the predetermined DC voltage to the corresponding data lines and the sensing line corresponding to the transmission line.

During the fingerprint identification period, fingerprint identification is performed for the fingerprint sensing pixels in the fingerprint region where the touch position is located or for more fingerprint sensing pixels. For example, the fingerprint identification scan signals start to be sequentially shifted row by row, and for each row of fingerprint sensing pixels for which the fingerprint identification is to be performed, the switch SW1_FR on each sensing line to which each fingerprint sensing pixel within the fingerprint region among the row of fingerprint sensing pixels is connected is turned on; the switches SW1R, SW1G and SW1B on the data lines corresponding to the sensing line are turned off; the switch SW2 connected to the transmission line to which the sensing line corresponds is turned off (for stopping supplying of the display data or the predetermined DC voltage to the data lines and/or the sensing line); the switch SW2_FP connected to the transmission line to which the sensing line corresponds is turned on (for receiving the fingerprint identification signal); and the SW_TP connected to the transmission lines corresponding to the sensing line are tuned on (indicating there is no need to apply the co-driving signal due to the fact that the touch detection period ends).

Figure 10:
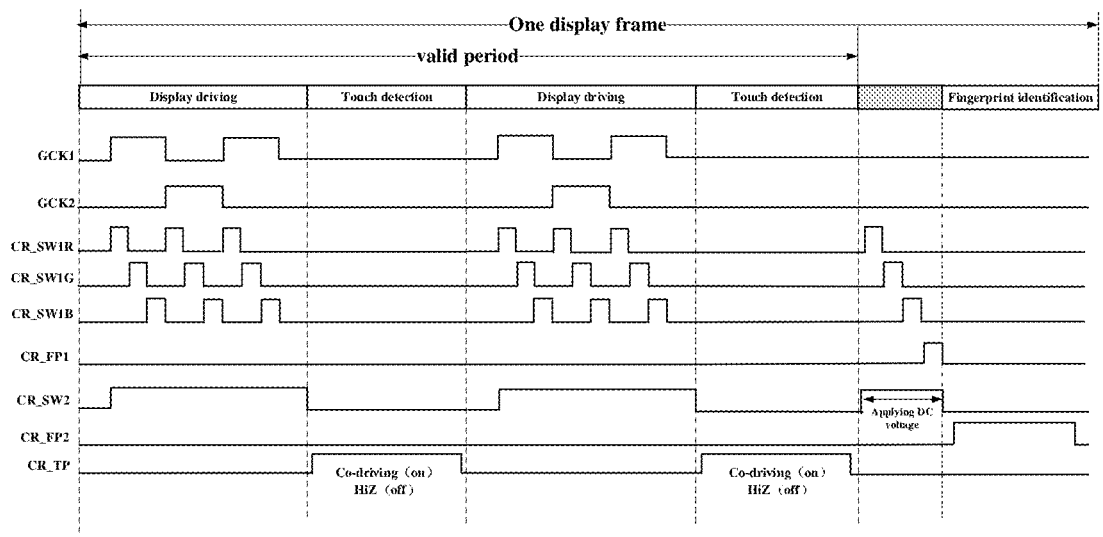

FIG. 10 is similar to the embodiment described with reference to FIG. 9, the difference is that, in the embodiment shown in FIG. 10, during the above predetermined time interval, each of transmission lines corresponding to the fingerprint sensing pixels in the fingerprint region where the touch position is located or more transmission lines (i.e., collectively referred to as the above-mentioned "a set of transmission lines") is simultaneously connected with its corresponding data lines and sensing line, for simultaneously applying the predetermined DC voltage to the data lines and the sensing line corresponding to the transmission line.

In the embodiments shown in FIGS. 9 and 10, by adding one predetermined time interval between the last touch detection period (or last display driving period) and the fingerprint identification period, the voltages on each data line and sensing line which may affect the fingerprint identification result are set to the predetermined DC voltage, which can reduce the influence on the fingerprint identification operation, thereby improving accuracy of the fingerprint identification result.

In another embodiment, as shown in FIG. 11, the operation of applying the predetermined DC voltage to the related data lines and sensing lines may also be performed during the touch detection period. For example, the valid period of each display frame includes at least one display driving period and at least one touch detection period that are interleaved, and one touch detection period is set immediately after each display driving period, wherein during each touch detection period, touch detection is performed for at least a part of the touch sensors, and the valid period of each display frame ends with a touch detection period, next, one fingerprint identification period is set immediately after the last touch detection period of each display frame, wherein a predetermined time period (the time length may be the minimum time length of a period required to complete the operation of turning on the above-mentioned four switches and successfully applying the predetermined DC voltage to related data lines and sensing lines, or may be greater than the minimum time length) overlaps a part of the last touch detection period.

For example, in FIG. 11, during the touch detection period, in order to reduce the influence on the touch detection result, the co-driving signal of the touch driving signal may be applied to respective data lines and sensing lines. In this case, each transmission line may be connected to its corresponding data lines and sensing line (if any), for example, SW1R, SW1G, SW1B on the data lines corresponding to each transmission line and the switch SW1_FP on the sensing line corresponding to the transmission line are turned on, and the switch SW_TP connected to the transmission line is turned on to apply the co-driving signal to each data line and sensing line; and in the predetermined time interval from back to front during the last touch detection period (the predetermined time period is included in the predetermined time interval), the switch SW_TP on the transmission line is turned off and the switch SW2 on the transmission line is turned on, the switches SW1R, SW1G, SW1B, SW1_FP mentioned above are kept on, so as to supply via the transmission line the predetermined DC voltage to the data lines and the sensing line corresponding to the transmission line, so that there is no need to additionally configure the period during which the data lines and the sensing line are set to the predetermined DC voltage, and the impact on the fingerprint identification operation can also be reduced, so that accuracy of the fingerprint identification result can be improved.

FIG. 12 shows an embodiment of a fingerprint identification period set when a display driving operation and a touch detection operation are simultaneously performed in a display frame.

In this case, the valid period of each display frame is divided into one display driving period, and a touch detection operation is performed for all the touch sensors during the one display driving period, thereafter, one fingerprint identification period is set immediately after a predetermined time interval from the end of the display driving period of a former display frame of two adjacent display frames, wherein the predetermined time period is included in the predetermined time interval.

Therefore, during the display driving period and the touch detection period, since the data lines are used to provide display data for each row of display pixels, the switch SW_TP corresponding to each transmission line is kept off, and the plurality of transmission lines are connected to all columns of display pixels via their respective corresponding data lines, but not connected to the fingerprint sensing pixels via their respective corresponding sensing lines. The gate scan signals are sequentially shifted from the first row to the last row of display pixels, and when shifted to each row of display pixels, display data can be written to each display pixel of the row of display pixels. For each display pixel in each row of display pixels, switches SW1R, SW1G, SW1B on the data lines connected to the sub-pixels of the display pixel are turned on in a time-division manner, the switch SW2 on the corresponding transmission line of the data lines to which the display pixel is connected is turned on, and the switches SW1_FR and SW2_FR and SW_TP on the corresponding transmission line are turned off, so as to write the display data to its sub-pixels via the transmission lines and the data lines.

Similarly, during the predetermined time interval, optionally, each of transmission lines corresponding to the fingerprint sensing pixels in the fingerprint region where the touch position is located or more transmission lines is connected to its corresponding data lines and sensing line in a time-division manner. For each transmission line among these transmission lines, the switches SW1R, SW1G, and SW1B on the corresponding data lines and the switch SW1_FR on the corresponding sensing line are turned on in a time-division manner (the switch control signals CR_SW1R, CR_SW1G, and CR_SW1B CR_FR1 in FIG. 12 are sequentially shown as high level); the switch SW2 on the transmission line is turned on (the switch control signal CR_SW2 in FIG. 12 is shown as high level), and the switch SW2_FR on the SW2_FP on the transmission line (corresponding to fingerprint identification) is turned off (the control signal CR_FR2 in FIG. 9 is shown as low level) and the switch SW_TP is turned off (the switch control signal CR_TP is shown as low level), so as to apply via the transmission line the predetermined DC voltage to the data lines and the sensing line corresponding to the transmission line, in this way, the influence on the fingerprint identification operation can be reduced, so that accuracy of the fingerprint identification result can be improved.

Figure 13A:
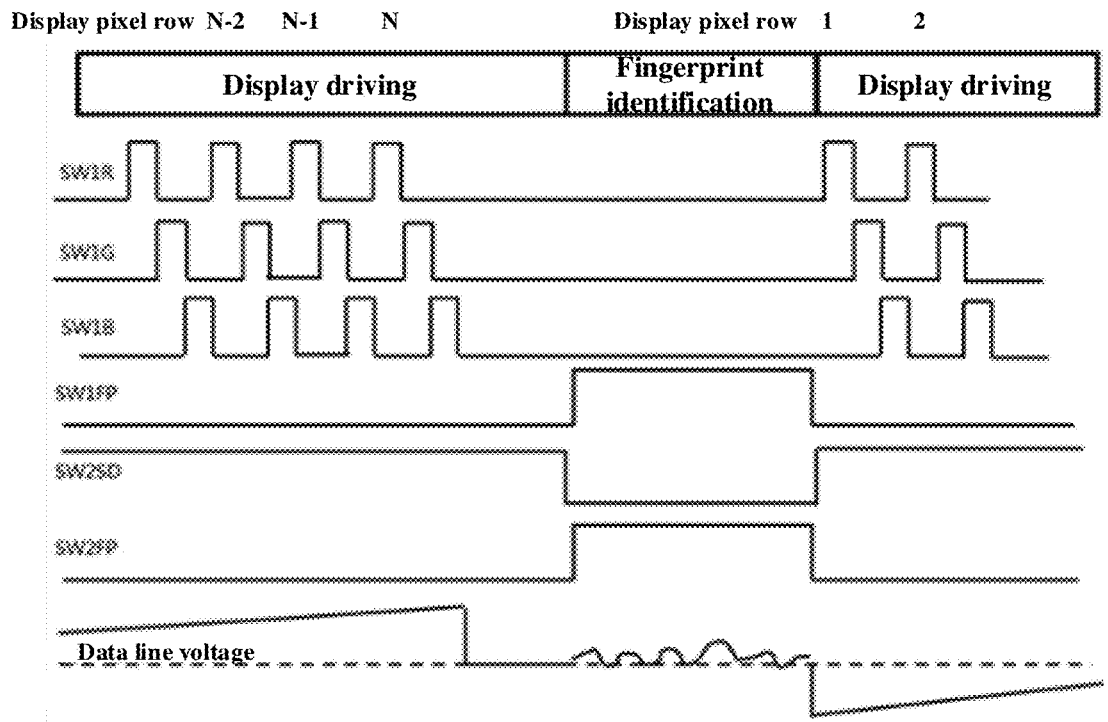
FIGS. 13A to 13B show schematic diagrams of example effect of the fingerprint identification method according to the embodiment of the present application.
Figure 13B:
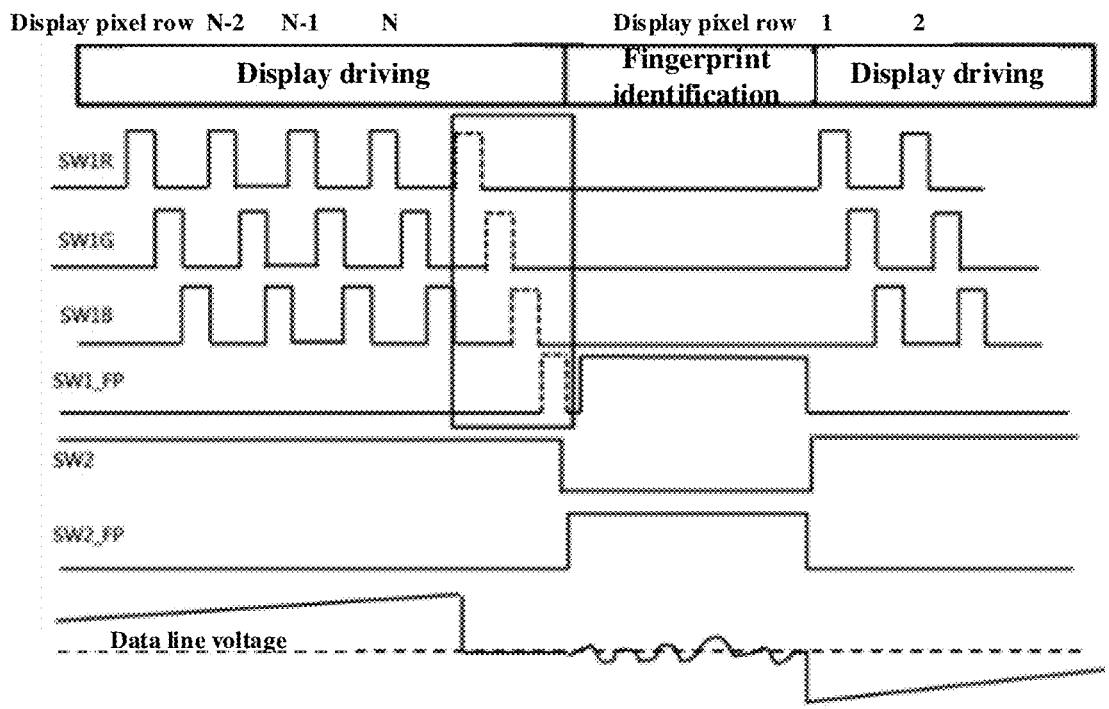

FIGS. 13A to 13B are schematic diagrams showing example effect of the fingerprint identification method according to the embodiment of the present application.

FIG. 13A shows the example effect when the fingerprint identification method of the embodiment of the present application is not adopted. FIG. 13B shows the example effect when the fingerprint identification method of the embodiment of the present application is adopted.

In FIGS. 13A to 13B, the timing diagram of each period is shown in a simplified manner, and the case where the display frame does not include the touch detection period and the fingerprint sensing pixel structure shown in FIG. 4 are taken as an example. The fingerprint identification period is set between valid periods of two adjacent display frames.

It can be seen that during the display driving period, the voltage on the data line to which a display pixel corresponding to a fingerprint sensing pixel is connected is not zero, and the voltage may be stored. In FIG. 13B, by means of presetting the voltage of the data line to the predetermined DC voltage (for example, zero) before the fingerprint identification period, the voltage on the data line has less fluctuation relative to the predetermined DC voltage during the fingerprint identification period, so that the impact on the fingerprint identification result for the fingerprint sensing pixel is small.

According to another aspect of the present application, an electronic device is further provided. The electronic device may include: a panel, a control circuit and a processor. The electronic device can be the same as the electronic device described with reference to FIG. 1.

The panel may be similar to that described with reference to FIG. 3, and may include, for example, display pixels arranged in an array, fingerprint sensing pixels arranged in an array within a fingerprint sensing region on the panel, and a plurality of transmission lines with the same quantity as the columns of display pixels, each transmission line among at least a portion of the transmission lines (i.e., fingerprint sensing region-related transmission lines, corresponding to the entire fingerprint sensing region) being selectively connected with one column of display pixels and one column of fingerprint sensing pixels corresponding thereto within the fingerprint sensing region. Optionally, in order to realize selective connections of transmission lines, a switch module may also be included on the panel, and of course, the switch module may also be provided independently of the panel.

Optionally, the panel may also include a first GOA circuit and a second GOA circuit, wherein the first GOA circuit is configured to generate gate scan signals that are shifted sequentially or suspend shifting the gate scan signals, based on a first set of timing signals obtained from the control circuit, and the second GOA circuit is configured to generate fingerprint identification scan signals that are shifted sequentially or suspend shifting the fingerprint identification scan signals, based on a second set of timing signals obtained from the control circuit. In addition, in other embodiments, the first GOA circuit and the second GOA circuit may also be provided independently of the panel.

The control circuit may include: a display driving circuit, configured to write display data to at least a part of rows of display pixels via the plurality of transmission lines during each display driving period, so that the at least a part of rows of display pixels performs displaying according to the written display data, and to set voltages on a set of transmission lines (including all transmission lines or at least including the transmission lines corresponding to the fingerprint sensing pixels within the determined fingerprint region (if any)) among the at least a portion of the transmission lines to a predetermined DC voltage during a predetermined time period before a start of each fingerprint identification period; a fingerprint identification control circuit, configured to receive fingerprint identification signals from at least a part of the fingerprint sensing pixels via the set of transmission lines during each fingerprint identification period, and generate an fingerprint identification result, wherein a valid period of each display frame is divided into a predetermined number of display driving periods, and one fingerprint identification period is set after at least one display driving period among the predetermined number of display driving periods.

In the case where the panel is further configured with a touch detection function, optionally, the control circuit may further include a touch control circuit, and the touch control circuit is configured to acquire touch sensing signals from the plurality of touch sensors, wherein the touch sensing signals are used to determine a fingerprint region where a touch position is located within the fingerprint sensing region.

Optionally, the control circuit may be integrated in one integrated circuit chip, as shown in the integrated circuit 200 in FIG. 3.

Optionally, the control circuit may be divided into more or less circuits according to specific operations or different circuit design modes. For example, the control circuit may also include a switching circuit, etc., and the circuits may be physically independent or of mutual inclusion relationship, or any combination of these circuits may be integrated into one integrated circuit (IC) chip, for example, the display driving circuit and the touch control circuit may be integrated into one IC chip, such as the TDDI chip; the display driving circuit, the fingerprint identification control circuit and the touch control circuit may be integrated into one IC chip, such as an FTDI chip; or each circuit may be an independent IC chip.

Optionally, the switching circuit (for example, implemented with a switch module) may be connected with the display driving circuit, the fingerprint identification control circuit and the touch control circuit, and configured to acquire a switching control signal therefrom to switch the circuit to currently interact with the panel.

Optionally, the display driving circuit is used to realize the operation of display driving, for example, a first set of timing signals (for generating the shifted gate scan signals, such as a clock signal, a start pulse signal, etc.) may be provided to the first GOA circuit, and display data may be provided to the data lines selectively connected to respective transmission lines of the panel, and also provide a predetermined DC voltage to the data lines and sensing lines selectively connected to for example the at least a part of transmission lines (i.e., fingerprint sensing region-related transmission lines, corresponding to the entire fingerprint sensing region) of the panel before the fingerprint identification period enters.

The fingerprint identification control circuit is configured to realize the fingerprint identification operation, for example, a second set of timing signals (for generating the shifted fingerprint identification scan signals, such as a clock signal, a start pulse signal, etc.) may be provided to the second GOA circuit, and the fingerprint identification signals may be obtained from the fingerprint sensing pixels on the panel.

The touch circuit is configured to realize the touch detection operation. For example, touch driving signals may be applied to touch sensors on the panel, and touch sensing signals may be obtained from these touch sensors, wherein the touch sensing signals can be used to determine the fingerprint region where the touch position is located.

Optionally, the electronic device may further include a processor, which is coupled to the control circuit, and may, for example, provide display image frame information to the control circuit, so that the display driving circuit in the control circuit may provide display data to a plurality of transmission lines of the panel, and may receive the fingerprint identification result from the fingerprint identification control circuit. In addition, optionally, the processor may also receive touch sensing signals from the touch control circuit, determine the touch position based on the touch sensing signals, and optionally determine the fingerprint region where the touch position is located, so as to control the fingerprint identification control circuit to perform fingerprint identification on the fingerprint sensing pixels in the fingerprint region; the processor may also provide to the control circuit timing-related information which causes a valid period of each display frame to be divided into a predetermined number of display driving periods, and one fingerprint identification period to be set after at least one display driving period among the predetermined number of display driving periods, and so on. In addition, in addition to the listed operations, the processor may also perform other related operations required in the process of controlling display, fingerprint identification and optionally touch detection, which is not limited in the present application.

More details of respective operations of the control circuit and/or the processor in the electronic device are the same with the contents described with reference to FIGS. 6-13B which have been described in detail above, so no repetition is made here.

According to another aspect of the present application, a control circuit is further provided, optionally, the control circuit is similar to the control circuit in the electronic device described above.

According to different design requirements, the control circuit (and the various partial circuits it includes) can be implemented in the form of hardware, firmware, software (i.e., program), or in many combinations of the foregoing three forms.

In terms of hardware form, the control circuit (and the various partial circuits it includes) may be implemented in logic circuits on an integrated circuit. The relevant functions of the control circuit (and the various partial circuits it includes) may be implemented in hardware by using a hardware description language (e.g., Verilog HDL or VHDL) or other suitable programming language. For example, the relevant functions of the control circuit (and the respective circuits it includes) may be implemented in one or more controllers, microcontrollers, microprocessors, application-specific integrated circuits (ASIC), digital signal processors (DSP), field programmable gate arrays (FPGA) and/or various logic blocks, modules and circuits in other processing units.

In terms of software form and/or firmware form, the control circuit (and the respective circuits it includes) may be implemented using a general-purpose programming language (e.g., C or C++) or other suitable programming language. The programming code may be recorded/stored in a recording medium including, for example, a read only memory (ROM), a storage device, and/or a random access memory (RAM). The programming code can be accessed from the recording medium and executed by a computer, a central processing unit (CPU), a controller, a microcontroller or a microprocessor to perform the relevant functions. For the recording medium, a "non-transitory computer-readable medium" such as a magnetic tape, a magnetic disk, a card, a semiconductor memory, or a programmed logic circuit may be used. In addition, the programming code can be provided to the computer (or CPU) via any transmission medium such as a communication network or radio waves. The communication network is, for example, the Internet, wired communication, wireless communication, or other communication media.

It will be apparent to a person skilled in the art that various modifications and changes can be made to the structure of the disclosed embodiments without departing from the scope or spirit of the present disclosure. In view of the foregoing, it is intended that the present disclosure cover modifications and changes of the present disclosure that fall within the scope of the appended claims and their equivalents.

What is claimed is:

1. A fingerprint identification method for a panel, wherein the panel includes: display pixels arranged in an array, fingerprint sensing pixels arranged in an array within a fingerprint sensing region on the panel, and a plurality of transmission lines, each transmission line among at least a portion of the transmission lines being selectively connected with one column of display pixels and one column of fingerprint sensing pixels corresponding to the transmission line within the fingerprint sensing region, and each display pixel within the fingerprint sensing region being configured with one fingerprint sensing pixel, and the fingerprint identification method comprises:

dividing a valid period of each display frame into a predetermined number of display driving periods, and setting one fingerprint identification period after at least one display driving period among the predetermined number of display driving periods, wherein, a quantity of the fingerprint identification period is an integer equal to or greater than one, during each display driving period, connecting the plurality of transmission lines to all columns of display pixels, and writing display data to at least one row of display pixels via the plurality of transmission lines, so that the at least one row of display pixels performs displaying according to the written display data, during each fingerprint identification period, connecting a set of transmission lines among the at least a portion of the transmission lines with at least a part of the fingerprint sensing pixels, and receiving fingerprint identification signals via the set of transmission lines, and during a predetermined time period before a start of each fingerprint identification period, connecting each transmission line among the set of transmission lines to one column of display pixels and one column of fingerprint sensing pixels corresponding to the transmission line, and setting voltages on the set of transmission lines to a predetermined DC voltage.

2. The fingerprint identification method according to claim 1, wherein the step of setting one fingerprint identification period after at least one display driving period among the predetermined number of display driving periods comprises:

setting one fingerprint identification period immediately after a predetermined time interval from an end of each display driving period among the predetermined number of display driving periods, wherein the predetermined time period is included in the predetermined time interval.

3. The fingerprint identification method according to claim 2, wherein the step of during each fingerprint identification period, connecting a set of transmission lines among the at least a portion of the transmission lines with at least a part of the fingerprint sensing pixels, and receiving fingerprint identification signals via the set of transmission lines comprises:

during each fingerprint identification period, connecting the at least a portion of the transmission lines respectively to all the fingerprint sensing pixels corresponding thereto, and receiving, row by row and via the at least a portion of the transmission lines, fingerprint identification signals sensed by the at least one row of fingerprint sensing pixels.

4. The fingerprint identification method according to claim 1, wherein the panel is further configured with a plurality of touch sensors, wherein the step of setting one fingerprint identification period after at least one display driving period among the predetermined number of display driving periods comprises:

setting one touch detection period immediately after each display driving period, or setting one touch detection period immediately after each display driving period other than the last display driving period, wherein during each touch detection period, a touch detection operation is performed for at least a part of the plurality of touch sensors, and the valid period of the display frame ends with a display driving period or a touch detection period;

setting one fingerprint identification period immediately after a predetermined time interval from an end of the last display driving period or the last touch detection period of each display frame, wherein the predetermined time period is included in the predetermined time interval.

5. The fingerprint identification method according to claim 1, wherein the panel is further configured with a plurality of touch sensors, wherein the step of setting one fingerprint identification period after at least one display driving period among the predetermined number of display driving periods comprises:

dividing the valid period of each display frame into one display driving period, and performing a touch detection operation for the plurality of touch sensors during the one display driving period, setting one fingerprint identification period immediately after a predetermined time interval from an end of the display driving period of a former display frame in two adjacent display frames, wherein the predetermined time period is included in the predetermined time interval.

6. The fingerprint identification method according to claim 1, wherein the panel is further configured with a plurality of touch sensors, wherein the step of setting one fingerprint identification period after at least one display driving period among the predetermined number of display driving periods comprises:

setting one touch detection period immediately after each display driving period, wherein during each touch detection period, a touch detection operation is performed for at least a part of the plurality of touch sensors, and the valid period of the display frame ends with a touch detection period, setting one fingerprint identification period immediately after the last touch detection period of each display frame, wherein the predetermined time period partially overlaps with the last touch detection period.

7. The fingerprint identification method according to claim 4, wherein the step of during each fingerprint identification period, connecting a set of transmission lines among the at least a portion of the transmission lines with at least a part of the fingerprint sensing pixels, and receiving fingerprint identification signals via the set of transmission lines comprises:

during the fingerprint identification period, connecting the at least a portion of the transmission lines respectively with all the fingerprint sensing pixels corresponding thereto, and receiving, row by row and via the at least a portion of the transmission lines, fingerprint identification signals sensed by all the fingerprint sensing pixels.

8. The fingerprint identification method according to claim 5, wherein the step of during each fingerprint identification period, connecting a set of transmission lines among the at least a portion of the transmission lines with at least a part of the fingerprint sensing pixels, and receiving fingerprint identification signals via the set of transmission lines comprises:

during the fingerprint identification period, connecting the at least a portion of the transmission lines respectively with all the fingerprint sensing pixels corresponding thereto, and receiving, row by row and via the at least a portion of the transmission lines, fingerprint identification signals sensed by all the fingerprint sensing pixels.

9. The fingerprint identification method according to claim 6, wherein the step of during each fingerprint identification period, connecting a set of transmission lines among the at least a portion of the transmission lines with at least a part of the fingerprint sensing pixels, and receiving fingerprint identification signals via the set of transmission lines comprises:

during the fingerprint identification period, connecting the at least a portion of the transmission lines respectively with all the fingerprint sensing pixels corresponding thereto, and receiving, row by row and via the at least a portion of the transmission lines, fingerprint identification signals sensed by all the fingerprint sensing pixels.

10. The fingerprint identification method according to claim 4, further comprising:

acquiring touch detection signals for each touch detection period;

based on the touch detection signals, determining a fingerprint region where a touch position is located, wherein fingerprint sensing pixels within the fingerprint region are of M rows and N columns, both M and N are integers greater than or equal to one, and less than or equal to a total number of rows and a total number of columns of the array of the fingerprint sensing pixels, respectively, wherein the step of during each fingerprint identification period, connecting a set of transmission lines among the at least a portion of the transmission lines with at least a part of the fingerprint sensing pixels, and receiving fingerprint identification signals via the set of transmission lines comprises:

during each fingerprint identification period, connecting N transmission lines corresponding to the N columns of fingerprint identification pixels to all fingerprint sensing pixels corresponding to the N transmission lines; and receiving, row by row and via the N transmission lines, the fingerprint identification signals sensed by M rows and N columns of fingerprint sensing pixels in the fingerprint region, for the M rows of fingerprint sensing pixels.

11. The fingerprint identification method according to claim 5, further comprising:

acquiring touch detection signals for each touch detection period;

based on the touch detection signals, determining a fingerprint region where a touch position is located, wherein fingerprint sensing pixels within the fingerprint region are of M rows and N columns, both M and N are integers greater than or equal to one, and less than or equal to a total number of rows and a total number of columns of the array of the fingerprint sensing pixels, respectively, wherein the step of during each fingerprint identification period, connecting a set of transmission lines among the at least a portion of the transmission lines with at least a part of the fingerprint sensing pixels, and receiving fingerprint identification signals via the set of transmission lines comprises:

during each fingerprint identification period, connecting N transmission lines corresponding to the N columns of fingerprint identification pixels to all fingerprint sensing pixels corresponding to the N transmission lines; and receiving, row by row and via the N transmission lines, the fingerprint identification signals sensed by M rows and N columns of fingerprint sensing pixels in the fingerprint region, for the M rows of fingerprint sensing pixels.

12. The fingerprint identification method according to claim 6, further comprising:

acquiring touch detection signals for each touch detection period;

based on the touch detection signals, determining a fingerprint region where a touch position is located, wherein fingerprint sensing pixels within the fingerprint region are of M rows and N columns, both M and N are integers greater than or equal to one, and less than or equal to a total number of rows and a total number of columns of the array of the fingerprint sensing pixels, respectively, wherein the step of during each fingerprint identification period, connecting a set of transmission lines among the at least a portion of the transmission lines with at least a part of the fingerprint sensing pixels, and receiving fingerprint identification signals via the set of transmission lines comprises:

during each fingerprint identification period, connecting N transmission lines corresponding to the N columns of fingerprint identification pixels to all fingerprint sensing pixels corresponding to the N transmission lines; and receiving, row by row and via the N transmission lines, the fingerprint identification signals sensed by M rows and N columns of fingerprint sensing pixels in the fingerprint region, for the M rows of fingerprint sensing pixels.

13. The fingerprint identification method according to claim 1, wherein each display pixel within the fingerprint sensing region comprises a plurality of sub-pixels respectively connected with a plurality of data lines in one-to-one correspondence, the fingerprint sensing pixel corresponding to the display pixel is connected to a sensing line, and the plurality of data lines and the sensing line are connected to one transmission line through a switch module, during the predetermined time period, for each transmission line among the set of transmission lines, the switch module is controlled to switch so as to connect the transmission line with the plurality of data lines and the sensing line in a time-division manner or simultaneously.

14. An electronic device, comprising: a panel, a control circuit and a processor, wherein, the panel includes: display pixels arranged in an array, fingerprint sensing pixels arranged in an array within a fingerprint sensing region on the panel, and a plurality of transmission lines, each transmission line among at least a portion of the transmission lines being selectively connected with one column of display pixels and one column of fingerprint sensing pixels corresponding to the transmission line within the fingerprint sensing region, and each display pixel within the fingerprint sensing region being configured with one fingerprint sensing pixel, the control circuit includes:
a display driving circuit, configured to write display data to at least a part of rows of display pixels via the plurality of transmission lines during each display driving period, so that the at least a part of rows of display pixels performs displaying according to the written display data, and to set voltages on a set of transmission lines among the at least a portion of the transmission lines to a predetermined DC voltage during a predetermined time period before a start of each fingerprint identification period;
a fingerprint identification control circuit, configured to receive fingerprint identification signals from at least a part of the fingerprint sensing pixels via the set of transmission lines during each fingerprint identification period, and generate a fingerprint identification result,
the processor is configured to interact with the control circuit, to provide the control circuit with timing related information and display image information, and to obtain the fingerprint identification result, wherein the timing related information causes a valid period of each display frame to be divided into a predetermined number of display driving periods, and one fingerprint identification period to be set after at least one display driving period among the predetermined number of display driving periods, wherein, a quantity of the fingerprint identification period is an integer equal to or greater than one.

15. The electronic device according to claim 14, wherein the panel is further configured with a plurality of touch sensors, and the control circuit further comprises a touch control circuit,
the touch control circuit is configured to acquire touch sensing signals from the plurality of touch sensors, wherein the touch sensing signals are used to determine by the processor a fingerprint region where a touch position is located within the fingerprint sensing region.

16. A control circuit for a panel, the panel including: display pixels arranged in an array, fingerprint sensing pixels arranged in an array within a fingerprint sensing region on the panel, and a plurality of transmission lines, each transmission line among at least a portion of the transmission lines being selectively connected with one column of display pixels and one column of fingerprint sensing pixels corresponding to the transmission line within the fingerprint sensing region, and each display pixel within the fingerprint sensing region being configured with one fingerprint sensing pixel, and the control circuit comprising:
a display driving circuit, configured to write display data to at least a part of rows of display pixels via the plurality of transmission lines during each display driving period, so that the at least a part of rows of display pixels performs displaying according to the written display data, and to set voltages on a set of transmission lines among the at least a portion of the transmission lines to a predetermined DC voltage during a predetermined time period before a start of each fingerprint identification period;
a fingerprint identification control circuit, configured to receive fingerprint identification signals from at least a part of the fingerprint sensing pixels via the set of transmission lines during each fingerprint identification period, and generate a fingerprint identification result,
wherein a valid period of each display frame is divided into a predetermined number of display driving periods, and one fingerprint identification period is set after at least one display driving period among the predetermined number of display driving periods, wherein, a quantity of the fingerprint identification period is an integer equal to or greater than one.

17. The control circuit of claim 16, wherein the panel is further configured with a plurality of touch sensors, the control circuit further comprises a touch control circuit,
the touch control circuit is configured to acquire touch sensing signals from the plurality of touch sensors, wherein the touch sensing signals are used to determine a fingerprint region where a touch position is located within the fingerprint sensing region.

18. The control circuit of claim 17, wherein one or more of the display driving circuit, the fingerprint identification control circuit and the touch control circuit are integrated in one chip.

* * * * *